US012578677B2

(12) United States Patent
Ishii et al.

(10) Patent No.: US 12,578,677 B2
(45) Date of Patent: Mar. 17, 2026

(54) PROCESS CARTRIDGE

(71) Applicant: CANON KABUSHIKI KAISHA, Tokyo (JP)

(72) Inventors: Soichi Ishii, Kanagawa (JP); Akitoshi Toyota, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/954,667

(22) Filed: Nov. 21, 2024

(65) Prior Publication Data

US 2025/0164925 A1 May 22, 2025

(30) Foreign Application Priority Data

Nov. 21, 2023 (JP) ................................ 2023-197502

(51) Int. Cl.
*G03G 21/18* (2006.01)

(52) U.S. Cl.
CPC ..... *G03G 21/1832* (2013.01); *G03G 21/1821* (2013.01); *G03G 2221/1861* (2013.01)

(58) Field of Classification Search
CPC ........... G03G 21/1832; G03G 21/1821; G03G 21/1828; G03G 2221/1861; G03G 2221/1609
See application file for complete search history.

(56) References Cited

U.S. PATENT DOCUMENTS

| | | | | |
|---|---|---|---|---|
| 5,729,796 A * | 3/1998 | Miura | G03G 21/1832 399/114 |
| 6,002,896 A * | 12/1999 | Miyamoto | G03G 21/1832 399/114 |
| 2003/0156856 A1 | 8/2003 | Arimitsu et al. | |
| 2003/0223772 A1 * | 12/2003 | Kubota | G03G 21/1832 399/114 |
| 2010/0054798 A1 * | 3/2010 | Sato | G03G 21/1832 399/111 |
| 2024/0419124 A1 | 12/2024 | Ishii et al. | |

FOREIGN PATENT DOCUMENTS

| | | |
|---|---|---|
| EP | 0 793 151 B1 | 12/2002 |
| JP | H10-074030 A | 3/1998 |
| JP | H10-207325 A | 8/1998 |
| JP | 2002-040875 A | 2/2002 |
| JP | 3290597 B2 | 6/2002 |

OTHER PUBLICATIONS

Mar. 18, 2025 Extended Search Report in European Patent Application Pub. No. 24 214 116.6.

* cited by examiner

*Primary Examiner* — Sandra Brase
(74) *Attorney, Agent, or Firm* — Venable LLP

(57) ABSTRACT

A process cartridge includes: a drum unit including a drive member and a photosensitive drum; a frame body having an opening through which a part of the drum unit is exposed; a shutter member shielding the photosensitive drum exposed through the opening; and a link member connecting the frame body and the shutter member. The shutter member is movable from a shielding position to an open position. A joint between the link member and the shutter member is provided to a part of the shutter member. The link member has a first portion extending from the joint toward the outside of the shutter member. In the shielding position, at least a part of the first portion overlaps with the drive member in a drum axis direction and at least a part of the first portion overlaps with the drive member in a view in an opening direction of the opening.

11 Claims, 26 Drawing Sheets

PROCESS CARTRIDGE

BACKGROUND OF THE INVENTION

Field of the Invention

The present invention relates to a process cartridge.

Description of the Related Art

In a process cartridge that is attachable to and removable from an apparatus main body of an image forming apparatus and that includes a photosensitive drum and drive members such as a gear for inputting the driving force to the photosensitive drum, a scratch or a dent formed on the photosensitive drum or the drive member may have an adverse effect on resultant images. To address this issue, some disclosures have been made on a structure for protecting the process cartridge such that the photosensitive drum and the drive member do not become scratched or dented even while the process cartridge is removed from the image forming apparatus.

For example, Japanese Patent No. 3290597 discloses a structure for protecting a photosensitive member and electrical contacts, by using a shutter member for protecting a link member and a photosensitive drum.

According to Japanese Patent No. 3290597, because the shutter member protects not only the photosensitive drum but also the drive members for driving the photosensitive drum, the shutter member needs to be large in size so as to cover up the photosensitive drum and the drive members. As a result, the process cartridge itself may need to be increased in size.

SUMMARY OF THE INVENTION

An object of the present invention is to provide a protection for a cartridge while suppressing an increase in size.

The present invention is a process cartridge attachable to and removable from an apparatus main body of an image forming apparatus, the process cartridge comprising:

- a drum unit including a photosensitive drum rotatable about a rotational axis in parallel with a first direction and a drive member provided to an end of the photosensitive drum in the first direction;
- a frame body rotatably supporting the drum unit and having an opening that opens in a second direction intersecting with the first direction, the opening exposing a part of the drum unit in a circumferential direction thereof;
- a shutter member disposed downstream of a part of the photosensitive drum exposed through the opening in the second direction, and shielding a surface of the photosensitive drum, which is the part of the drum unit exposed through the opening,
- a link member supported on the frame body in a rotatable manner in a third direction that is a direction rotating about an axis parallel with the first direction and intersecting with the second direction and connecting the frame body and the shutter member attached to the link member, wherein
- the shutter member is caused to rotate by a rotation of the link member and is movable in the third direction between a shielding position shielding the exposed part of the photosensitive drum and an open position not shielding the exposed part of the photosensitive drum,
- a side of the photosensitive drum in the first direction in which the drive member is provided is a driving side, a side of the photosensitive drum in which the drive member is not provided is a non-driving side, and a direction in which the shutter member moves toward the open position from the shielding position within a movable range of the shutter member is a positive direction along the third direction,
- the link member is supported rotatably on a part of the frame body on the driving side in the first direction and attached to a part of the shutter member on the driving side in the first direction,
- in a state where the shutter member is at the shielding position, a joint between the link member and the shutter member is positioned on a part of the shutter member on the positive direction side along the third direction,
- the link member has a first portion extending from the joint toward the outside of the shutter member in the first direction from the non-driving side toward the driving side, and
- in a state where the shutter member is at the shielding position, at least a part of the first portion overlaps with the drive member in the first direction, and at least a part of the first portion overlaps with the drive member in a view in the second direction.

Further features of the present invention will become apparent from the following description of exemplary embodiments with reference to the attached drawings.

DESCRIPTION OF THE EMBODIMENTS

Exemplary embodiments for implementing the present invention will now be explained with reference to drawings. The sizes, the materials, the shapes of the components, and the relative positioning of the components described in the embodiments may have to be changed as appropriate, on the basis of the structure of the apparatus to which the present invention is applied, or on the basis of various conditions, and the embodiments described below are not indented to limit the scope of the present invention in any way.

The embodiments described below relates to an image forming apparatus that uses an electrophotographic system to form an image on a recording medium. Examples of the electrophotographic image forming apparatus includes an electrophotographic copier, an electrophotographic printer (such as a LED printer or a laser beam printer), a facsimile machine, and a word processor. In the electrophotographic image forming apparatus, an electrophotographic photosensitive member that is an image bearing member is uniformly charged. The charged photosensitive member is then exposed selectively, so that an electrostatic image is formed on the photosensitive member. The electrostatic image formed on the photosensitive member is then developed into a visible image, as a toner image, using toner that is a developer. The toner image formed on the photosensitive member is then transferred onto a recording medium such as recording paper or a plastic sheet. The toner image is then fixed by applying heat and pressure to the toner image having been transferred onto the recording medium, whereby recording the image on the recording medium.

Generally, such an image forming apparatus has various processing units that require maintenance. To facilitate the maintenance of such various processing units, process cartridges are put in use. A process cartridge is a cartridge including elements described above, such as a photosensitive member, a charging unit, a developing unit, and a cleaning unit, integrated into a frame body, and configured removable from the apparatus main body of an image forming apparatus. With such a process cartridge, it is possible to provide an image forming apparatus with excellent usability.

First Embodiment

A first embodiment will now be explained with reference to FIGS. 1A and 1B to 18. To begin with, a general configuration of an image forming apparatus according to the first embodiment will be explained with reference to FIG. 2.

Image Forming Apparatus

Figure 2:
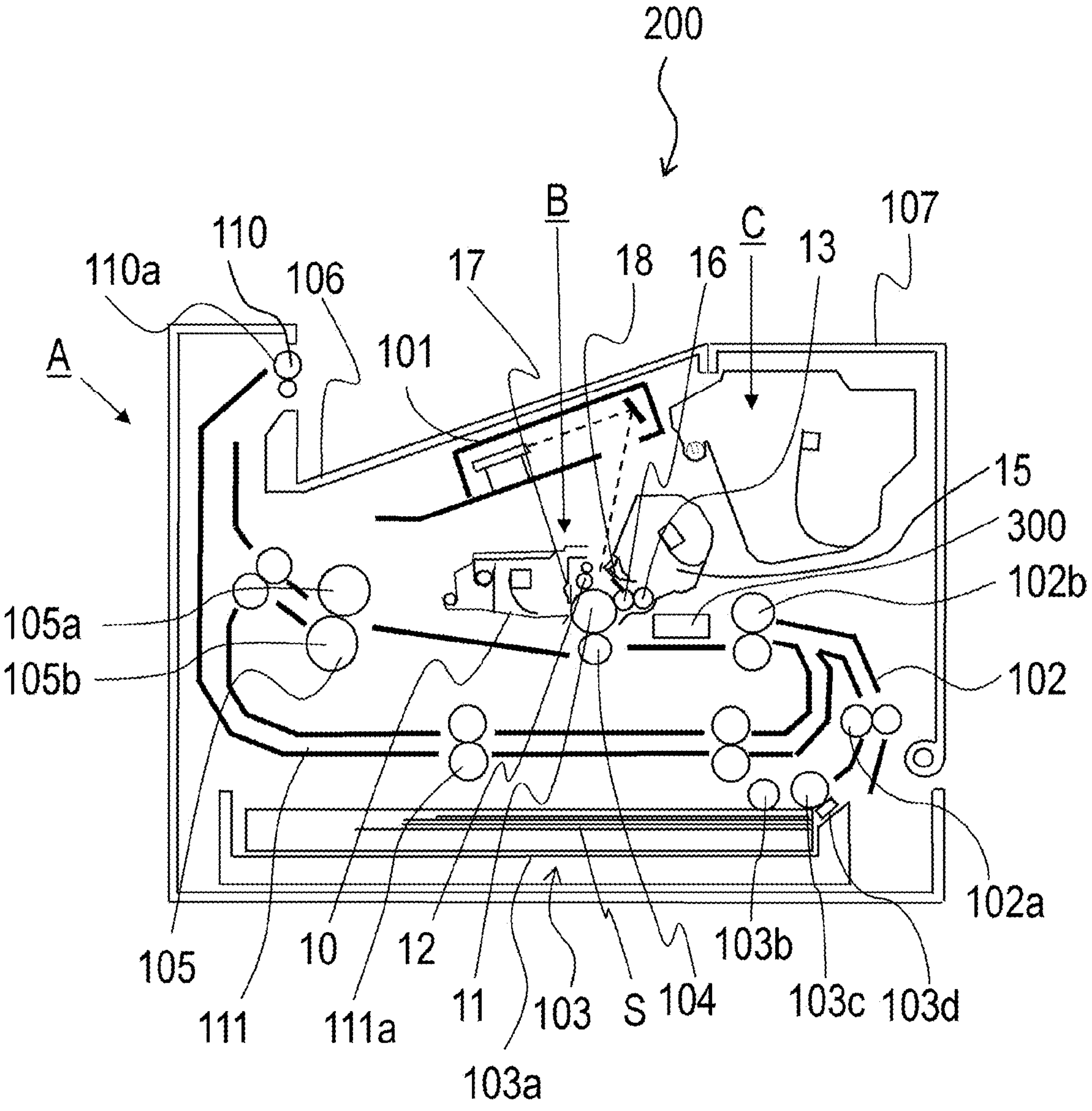
FIG. 2 is a cross-sectional view illustrating a general configuration of the image forming apparatus according to the first embodiment.

An image forming apparatus 200 according to the first embodiment is an electrophotographic laser printer. As illustrated in FIG. 2, the image forming apparatus 200 includes an apparatus main body (printer main body) A, a process cartridge B that is an image forming unit, and a toner cartridge C. In the apparatus main body A, elements such as a laser scanner 101, a sheet conveyor 102, a sheet feeder 103, a transfer roller 104, a fixing unit 105, a sheet discharging unit 110, and a reversing conveyor 111 are installed. The process cartridge B and the toner cartridge C are removably disposed inside the apparatus main body A, as will be described later more in detail. To make these cartridges removable, the apparatus main body A has a door 107.

The process cartridge B includes: a photosensitive drum 11 serving as an image bearing member as well as a photosensitive member; a charging roller 12 that is a charging member; a developing unit 15; and a cleaning blade 17 that is a cleaning member. Above the process cartridge B, the laser scanner 101 serving as an exposing unit is provided.

The charging roller 12 is disposed in contact with the outer circumferential surface of the photosensitive drum 11, and charges the photosensitive drum 11 with a voltage applied from the apparatus main body A. As the photosensitive drum 11 is rotated, the charging roller 12 is driven in rotation. The developing unit 15 has a developing roller 16 that is a developer carrier for carrying and conveying the toner that is a developer. The developing roller 16 is disposed facing the photosensitive drum 11.

The cleaning blade 17 is an elastic member disposed in contact with the outer circumferential surface of the photosensitive drum 11 and cleans the surface of the photosensitive drum 11. A leading end of the cleaning blade 17 makes an elastic contact with the photosensitive drum 11 thereby removing the residual toner from the photosensitive drum 11 after the passage of the sheet S (to be described later) between the photosensitive drum 11 and the transfer roller 104.

The sheet feeder 103 includes a cassette 103*a*, and a pickup roller 103*b* for feeding the topmost sheet S stored in the cassette 103*a*. The sheet feeder 103 also includes a separating roller 103*c* and a separation pad 103*d* for separating the sheets S one at a time that are fed by the pickup roller 103*b*. The sheet conveyor 102 includes a conveying roller pair 102*a* and a registration roller pair 102*b* for conveying the sheet S fed from the sheet feeder 103. The registration roller pair 102*b* conveys the sheet S into a transfer unit between the photosensitive drum 11 and the transfer roller 104, at the timing synchronized with the arrival of a toner image formed on the photosensitive drum 11.

The fixing unit 105 includes a fixing roller 105*a* being heated by a heat source such as a heater, and a pressing roller 105*b* that forms a fixing nip between which the sheet is held, with the fixing roller 105*a*. The sheet S having the toner image transferred in the transfer unit is conveyed to the fixing unit 105, and heated and pressed in the fixing nip. With this, the toner image is fixed onto the sheet S.

The sheet discharging unit 110 includes a discharging roller pair 110*a* and discharges the sheet S having the toner image fixed onto a discharge tray 106, using the discharging roller pair 110*a*. The reversing conveyor 111 has a reversing conveyor roller pair 111*a*, and reverses the sheet S having passed through the fixing unit 105, and conveys the sheet S toward the registration roller pair 102*b*, in the setting for forming images on both sides of the sheet S.

An operation of the image forming apparatus 200 will now be explained with reference to FIG. 2. The charging roller 12 charges the photosensitive drum 11 that is being driven in rotation by a driving source (motor), not illustrated, uniformly to a predetermined potential. The laser scanner 101 then exposes the charged surface of the photosensitive drum 11 on the basis of image information, and removes the electric charge from the exposed portion, so that an electrostatic latent image is formed. The developing roller 16 then supplies the toner to the electrostatic latent image on the photosensitive drum 11 and visualizes the image as a toner image.

In parallel with such a toner image forming operation, the sheet feeder 103 feeds a sheet S. The sheet S fed by the sheet feeder 103 is conveyed by the registration roller pair 102*b* into the transfer unit, at a timing synchronized with the timing at which the toner image on the photosensitive drum 11 arrives. As the sheet S passes through the transfer unit, the apparatus main body A applies a voltage to the transfer roller 104, to transfer the toner image on the photosensitive drum 11 onto the sheet S, as an unfixed image. The sheet S having the toner image transferred is then conveyed to the fixing unit 105, and the unfixed image thereon is heated and pressed, thereby being fixed on the surface of the sheet S. The sheet discharging unit 110 then discharges the sheet S having the toner image fixed and stacks the sheet S on the discharge tray 106. When images are to be formed on both sides of the sheet S, the sheet S is conveyed to the reversing conveyor 111, and a toner image is formed on the rear side of the sheet S, in the same manner as that described above.

Process Cartridge

Figure 3:
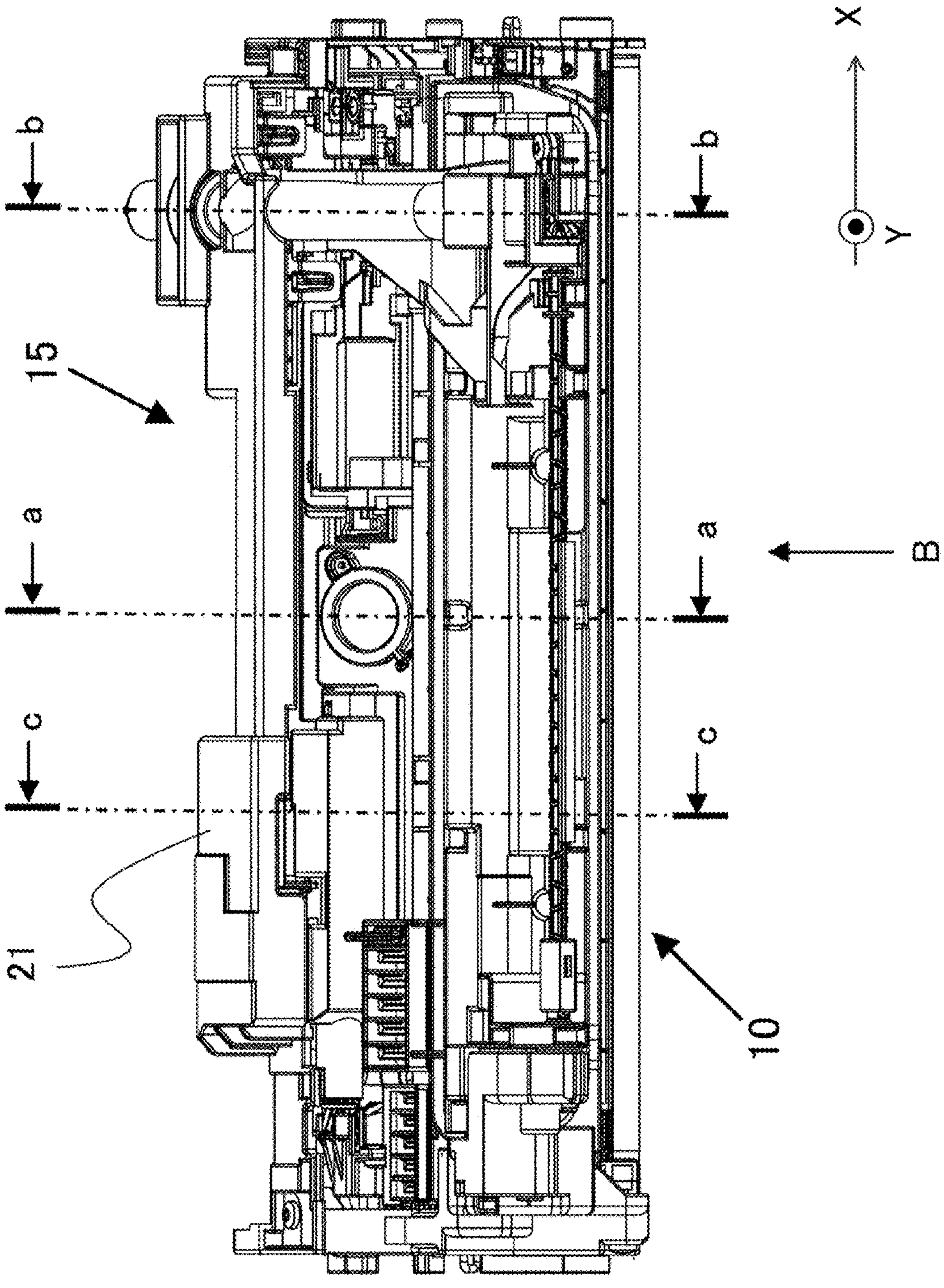
FIG. 3 is a front view of the process cartridge according to the first embodiment.
Figure 4:
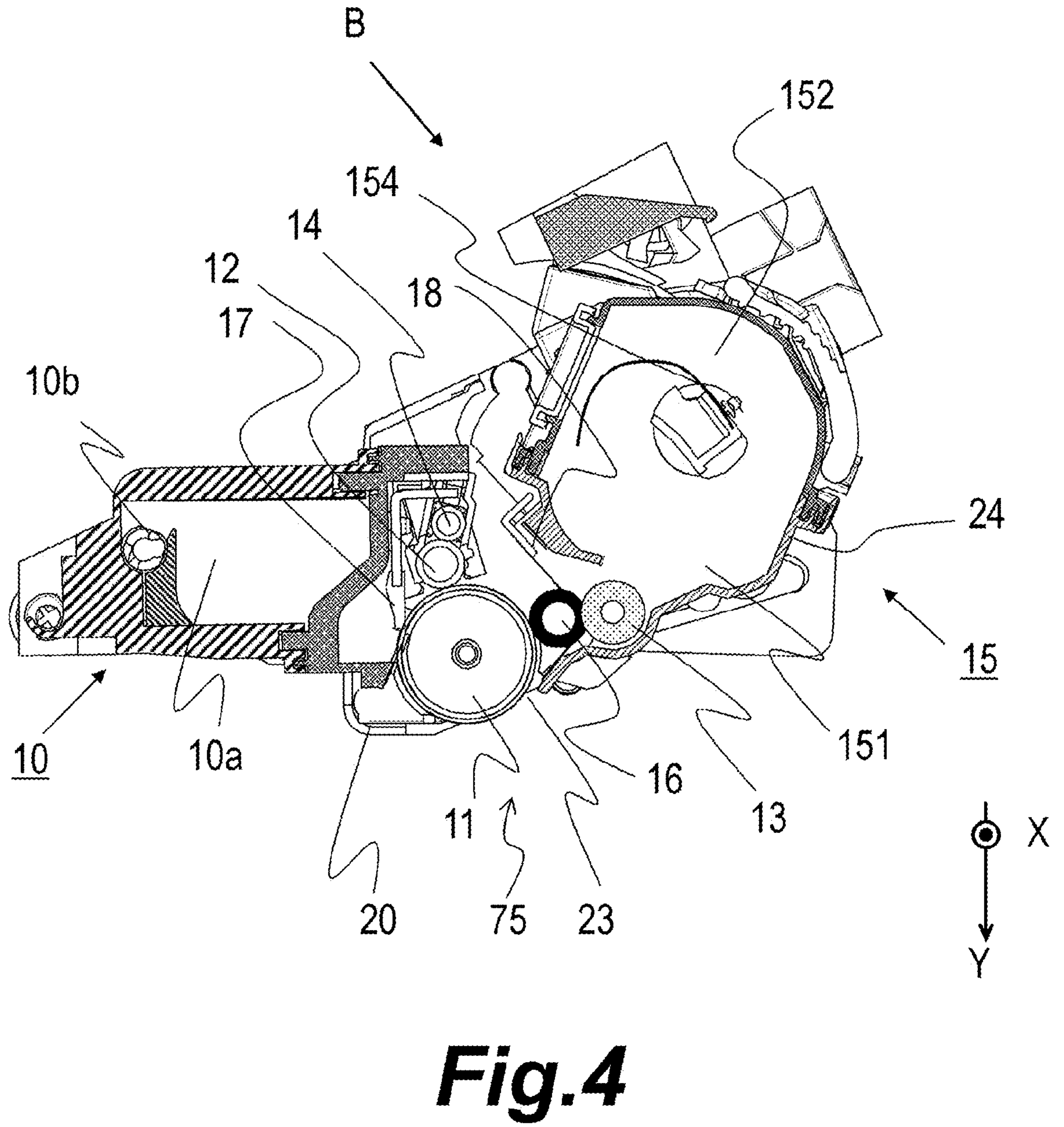
FIG. 4 is a sectional view along a-a in FIG. 3.
Figure 5:
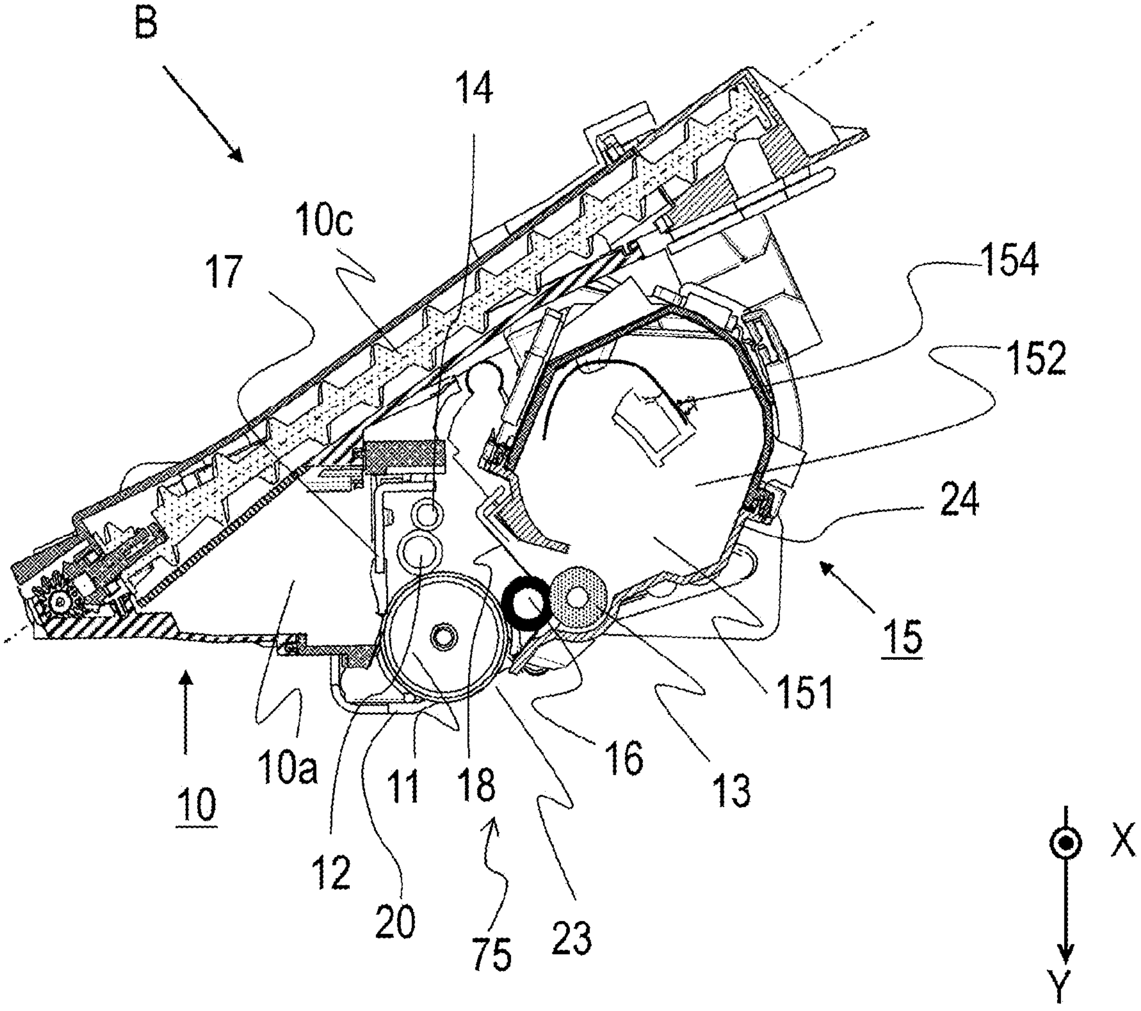
FIG. 5 is a sectional view along b-b in FIG. 3.

The process cartridge B will now be explained with reference to FIGS. 3 to 8A and 8B. As illustrated in FIGS. 3 to 5, the process cartridge B includes a cleaning unit (first unit) 10 including the photosensitive drum 11 and the cleaning blade 17, and a developing unit (second unit) 15 including the developing roller 16. The cleaning unit 10 has a cleaning frame body 20, and the developing unit 15 has a developing frame body 24. A cartridge frame body 75 forming the process cartridge B includes, in addition to the cleaning frame body 20 and the developing frame body 24, bearing members 4 and 5, and a side cover 7, which will be described later. The cleaning unit 10 includes the photosensitive drum 11, the cleaning blade 17, the charging roller 12, a charging roller cleaner 14, a waste toner primary storage 10*a*, a first waste toner conveyance channel 10*b*, and a second waste toner conveyance channel 10*c*. The charging roller cleaner 14 is a member for cleaning the charging roller 12. The toner (waste toner) removed from the photosensitive drum 11 by the cleaning blade 17 is conveyed from the waste toner primary storage 10*a*, through the first waste toner conveyance channel 10*b* and the second waste toner conveyance channel 10*c*, into the toner cartridge C.

Figure 6:
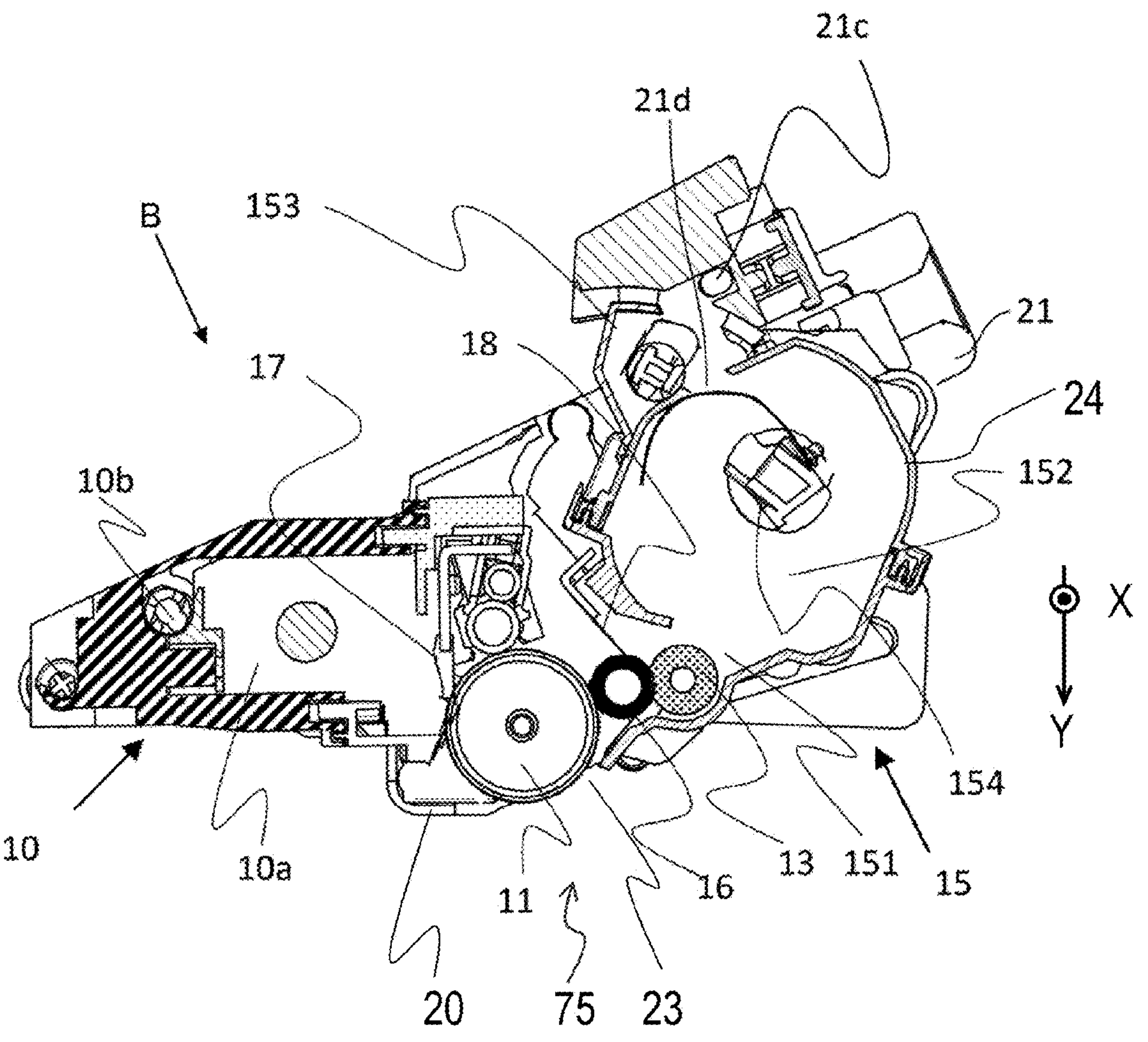
FIG. 6 is a sectional view along c-c in FIG. 3.

As illustrated in FIG. 6, the developing unit 15 includes the developing roller 16, a supply roller 13, a developing blade 18, a developing chamber 151, a developer storage chamber 152, and a toner receiving chamber 153. The developing roller 16 is disposed inside the developing chamber 151. The developer storage chamber 152 supplies the toner into the developing chamber 151. The toner receiving chamber 153 receives the toner supplied from the toner cartridge C. The developing roller 16 is rotated to carry the toner and supplies the toner to a developing zone of the photosensitive drum 11. The developing roller 16 then develops the electrostatic latent image formed on the photosensitive drum 11, using the toner. The supply roller 13 supplies the toner inside the developing chamber 151 to the developing roller 16. The supply roller 13 is disposed in such a manner that the direction of its rotational axis is in parallel with the direction of the rotational axis of the developing roller 16 and has an elastic layer such as a layer made of sponge on the outer circumferential surface, to facilitate conveyance of the developer. The developing blade 18 restricts the amount of toner attached (carried) on the circumferential surface of the developing roller 16 by coming into contact with the circumferential surface of the developing roller 16. The developing blade 18 also triboelectrically charges the toner.

The developer storage chamber 152 communicates with the developing chamber 151 and stores the toner to be supplied into the developing chamber 151. The toner stored in the developer storage chamber 152 is sent to the developing chamber 151 and supplied to the developing roller 16 by the rotation of a stirring member 154. The amount of remaining toner in the developer storage chamber 152 is detected by a remaining toner detector, not illustrated. Once the amount of toner in the developer storage chamber 152 drops to a level equal to or lower than a predetermined level, the toner in the toner cartridge C is supplied into the process cartridge B.

The toner receiving chamber 153 communicates with the developer storage chamber 152, and supplies the toner received from the toner cartridge C into the developer storage chamber 152. The toner is supplied from the toner cartridge C, through a supply port 21*c* of a stay 21, the toner receiving chamber 153, and a passage port 21*d*, and into the developing unit 15 of the process cartridge B, and is stored in the developer storage chamber 152.

A structure of the process cartridge B will now be explained in detail with reference to FIGS. 4, 7A, 7B, 8A, and 8B. As described earlier, the cleaning unit 10 includes the photosensitive drum 11, the charging roller 12, and the cleaning blade 17. The developing unit 15 includes the developing roller 16, the developing blade 18, the developing chamber 151, the developer storage chamber 152, and the toner receiving chamber 153.

Figure 7A:
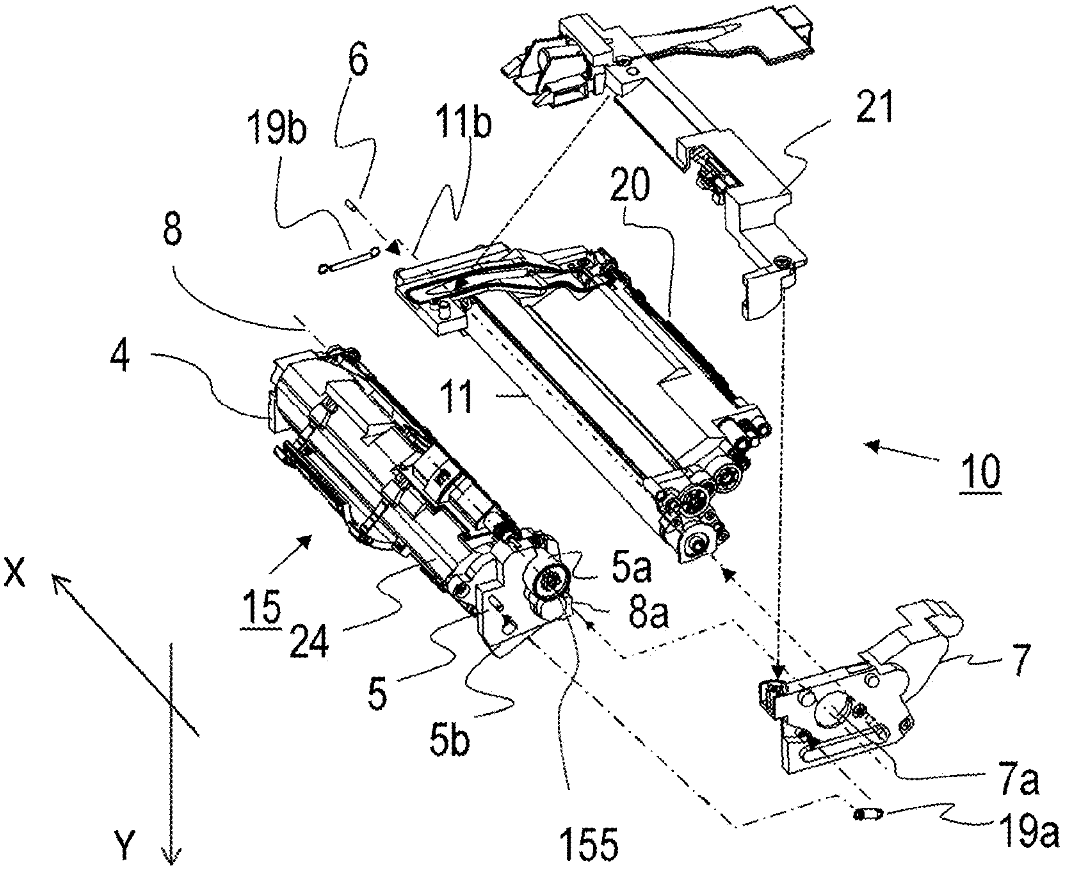
FIG. 7A is an exploded perspective view of the process cartridge according to the first embodiment.
Figure 7B:
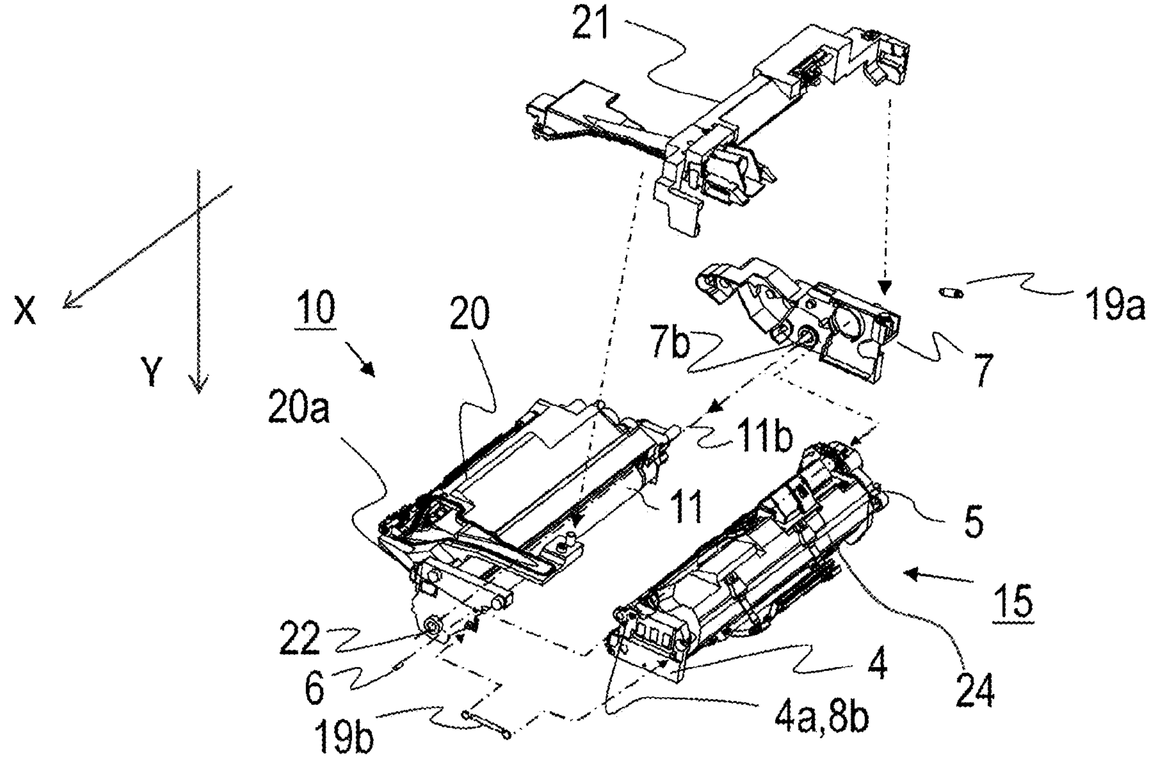
FIG. 7B is an exploded perspective view of the process cartridge according to the first embodiment.

As illustrated in FIGS. 7A and 7B, the cleaning unit 10 includes the cleaning frame body 20 forming a part of the cartridge frame body 75, the stay 21, and the side cover 7. The cleaning frame body 20 supports the cleaning blade 17, the charging roller 12, and the charging roller cleaner 14. As illustrated in FIG. 7B, one side of the photosensitive drum 11 is supported rotatably by a drum pin 22 attached to the cleaning frame body 20, and the opposite side of the photosensitive drum 11 is supported by a photosensitive drum support portion 7*b* provided to the side cover 7.

As illustrated in FIGS. 7A and 7B, a bearing member 4 and a bearing member 5 are provided to the respective ends of the developing roller 16 in the rotational axis direction. The developing unit 15 is coupled to the cleaning unit 10 in a pivotable manner about a swinging axis 8 defined by a line including a shaft 8*a* and a shaft 8*b*. The swinging axis 8 is disposed substantially in parallel with the rotating axis 11*b* of the photosensitive drum 11.

A structure by which the developing unit 15 is supported on the cleaning unit 10 will now be explained in detail. As illustrated in FIG. 7A, a cylindrical portion 5*a* of the bearing member 5, which is a part forming the cartridge frame body 75 of the cleaning unit 10, is supported in a cylindrical hole 7*a* provided to the side cover 7, which is also a part forming the cartridge frame body 75. The shaft 8*a* is defined by a common axis shared between the cylindrical hole 7*a* of the side cover 7 and the cylindrical portion 5*a* of the bearing member 5. To the rotational center of the cylindrical portion 5*a* of the bearing member 5, a developing coupling 155 that is a drive input member where the driving force from the apparatus main body A is input is provided.

Furthermore, as illustrated in FIG. 7B, a pin 6 is inserted into a cylindrical hole 20*a* provided to the cleaning frame body 20 of the cleaning unit 10 and into a cylindrical hole 4*a* provided to the bearing member 4, which forms a part of the cartridge frame body 75, in a manner straddling across the cylindrical holes 20*a* and 4*a*. The shaft 8*b* is defined by a common axis shared between the pin 6 and the cylindrical hole 4*a* of the bearing member 4. The shaft 8*a* and the shaft 8*b* are disposed substantially coaxially, and the swinging axis 8 is defined by a line including the shaft 8*a* and the shaft 8*b*, as mentioned earlier.

In the manner described above, the developing unit 15 is supported on the cleaning unit 10 in a pivotable manner about the swinging axis 8. Pressing springs 19*a*, 19*b* that are elastic members exert a force biasing the developing unit 15 against the photosensitive drum 11 in the cleaning unit 10, and the developing roller 16 is thus held in contact with the photosensitive drum 11.

Figure 8A:
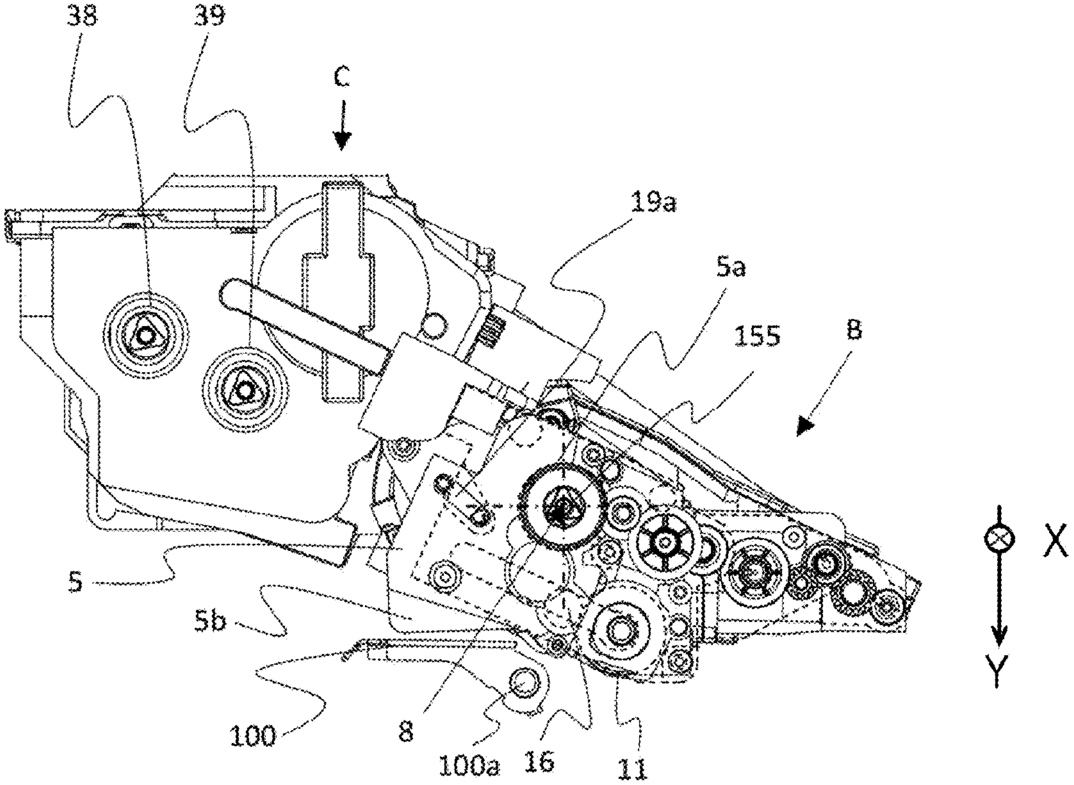
FIG. 8A is a side view illustrating a developing unit in contact with a photosensitive drum.
Figure 8B:
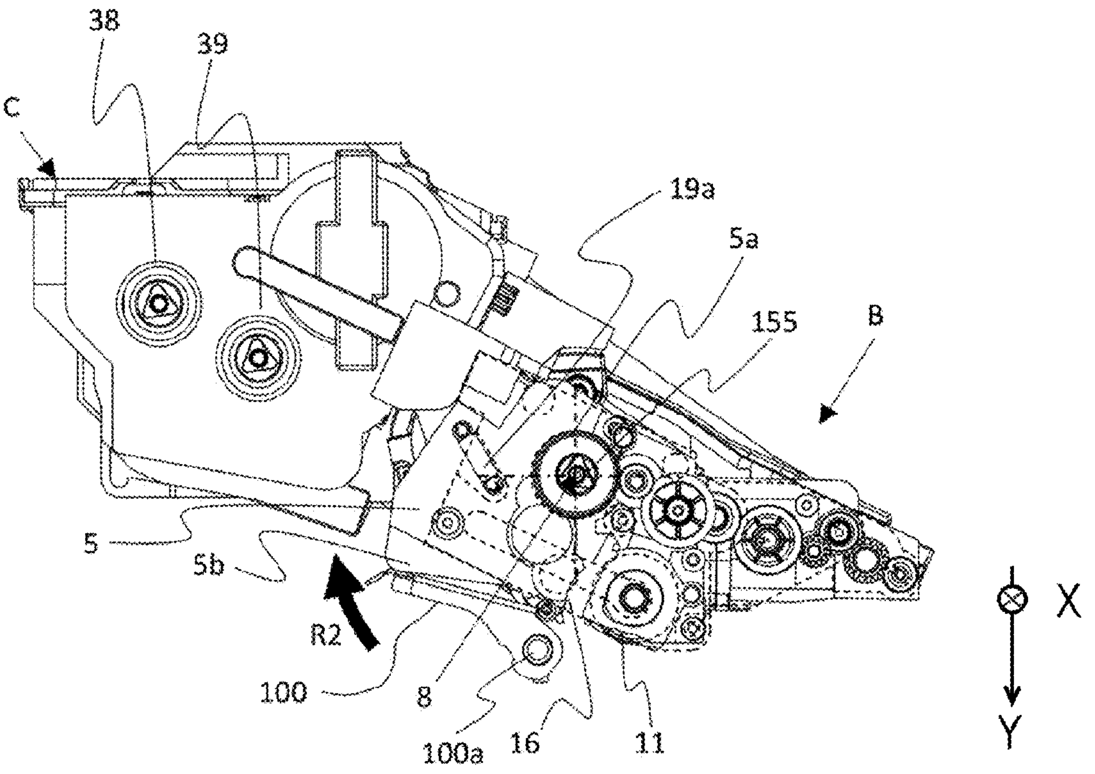
FIG. 8B is a side view illustrating a developing unit separated from a photosensitive drum.

An operation for releasing the contact between the developing unit 15 and the cleaning unit 10 will now be explained with reference to FIGS. 8A and 8B. FIGS. 8A and 8B are explanatory schematics with the side cover 7 removed so that a separating mechanism 100 of the apparatus main body A is shown. As illustrated in FIG. 8A, a protruded portion 5*b* is provided to the bearing member 5 at a position facing the separating mechanism 100. In the first embodiment, the separating mechanism 100 is provided below the developing unit 15, in the orientation in which the process cartridge B is mounted on the apparatus main body A. The protruded portion 5*b* is provided on the bottom end of the bearing member 5. The separating mechanism 100 is provided to the apparatus main body A, and is enabled to swing in substantially up and down about a swinging axis 100*a*, by a driving source such as a motor not illustrated.

As illustrated in FIG. 8A, when the protruded portion 5*b* is at a position not in contact with the separating mechanism 100, the developing roller 16 is kept in contact with the photosensitive drum 11 by the biasing force of the pressing springs 19*a*, 19*b*. This position is an image forming position at which the developing roller 16 is permitted to develop an electrostatic latent image formed on the surface of the photosensitive drum 11.

As illustrated in FIG. 8B, the separating mechanism 100 provided to the apparatus main body A swings about the swinging axis 100*a*, and comes into contact with the protruded portion 5*b*. With the force thus exerted to the protruded portion 5*b* from the separating mechanism 100, the developing unit 15 is caused to pivot about the swinging axis 8 in the direction of the arrow R2. As a result, the developing roller 16 separates from the photosensitive drum 11, against the biasing force of the pressing springs 19*a*, 19*b*. This position is a non-image forming position to which the developing roller 16 is evacuated from the image forming position.

When the separating mechanism 100 comes back to the position illustrated in FIG. 8A (contact position, image forming position), which is the original position, from the position illustrated in FIG. 8B (separated position, non-image forming position), the separating mechanism 100 moves away from the protruded portion 5*b*. The developing roller 16 is then brought into contact with the photosensitive drum 11 again, by the biasing force of the pressing springs 19*a*, 19*b*. In the manner described above, in the first embodiment, the separating mechanism 100 can switch the position of the developing unit 15 between the contact position (image forming position) and the separated position (non-image forming position). In other words, the orientation of the developing unit 15 is switchable between the contact position and the separated position with respect to the photosensitive drum 11, inside the process cartridge B. As a result, it is possible to suppress degradation of the toner and unnecessary toner consumption during the time of non-image formation.

As described above, the developing unit 15 pivots about the swinging axis 8, to move between the contact position and the separated position with respect to the cleaning unit 10. Therefore, when the developing unit 15 moves between the contact position and the separated position with respect to the cleaning unit 10, the resultant displacement of the developing coupling 155 can be kept very small, e.g., to a level equivalent to a fitting play. Specifically, the cylindrical portion 5*a* of the bearing member 5 is engaged with the cylindrical hole 7*a* of the side cover 7 (FIG. 7A) with a fitting play of 0.13 mm or less. Therefore, when the developing unit 15 moves between the contact position and the separated position, the resultant displacement of the developing coupling 155 does not exceed the fitting play.

Toner Cartridge

Figure 9:
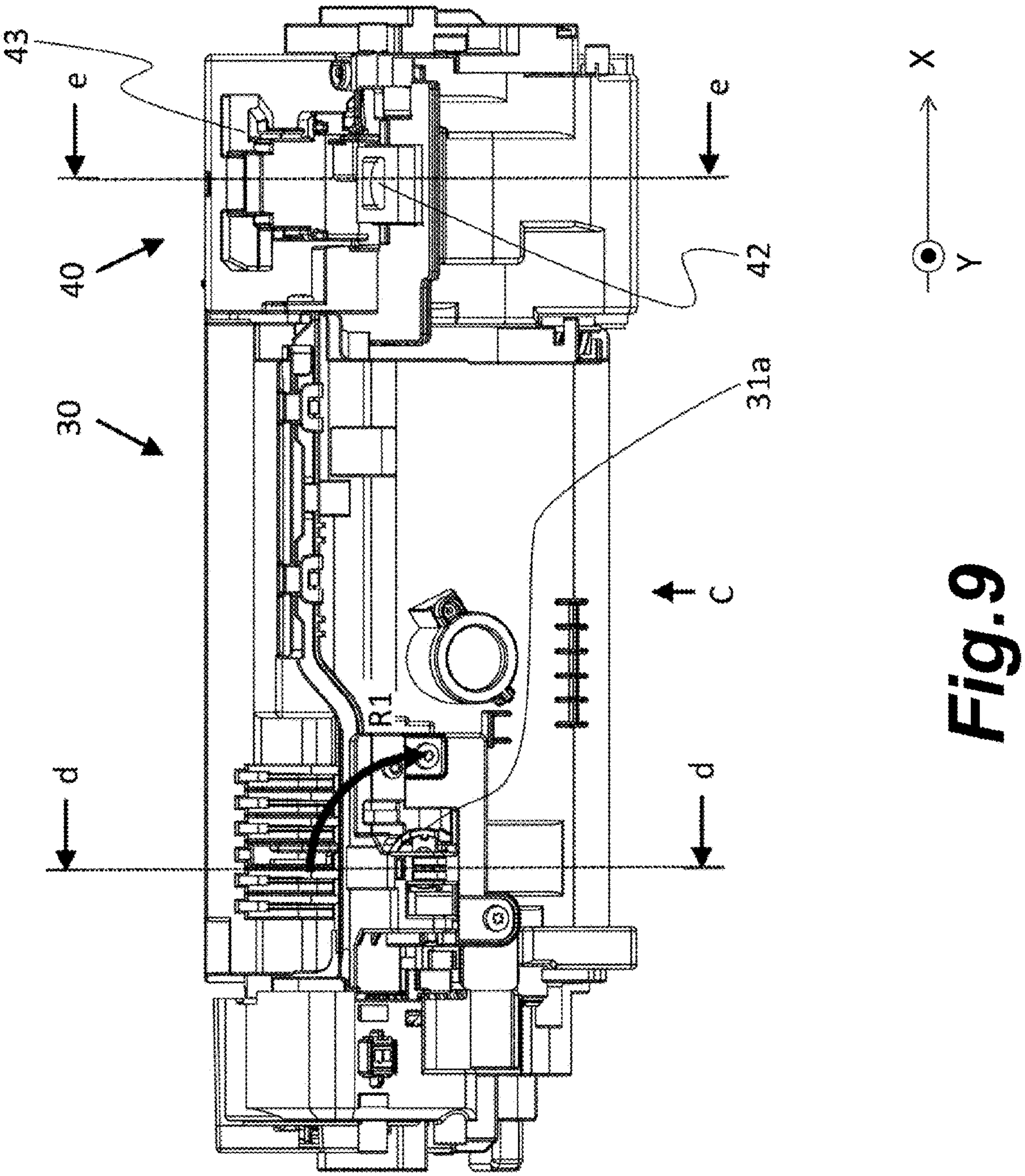
FIG. 9 is a front view of a toner cartridge according to the first embodiment.

The toner cartridge C will now be explained with reference to FIGS. 9 to 12A and 12B. As illustrated in FIG. 9, the toner cartridge C is provided with a toner supplying unit 30 and a waste toner storage unit 40. The toner cartridge C is removable, together with the process cartridge B, from the apparatus main body A, and is also removable from the process cartridge B. The toner supplying unit 30 is enabled to feed toner into the process cartridge B. The waste toner storage unit 40 is enabled to store the waste toner collected by the process cartridge B.

Toner Supply Unit

Figure 10:
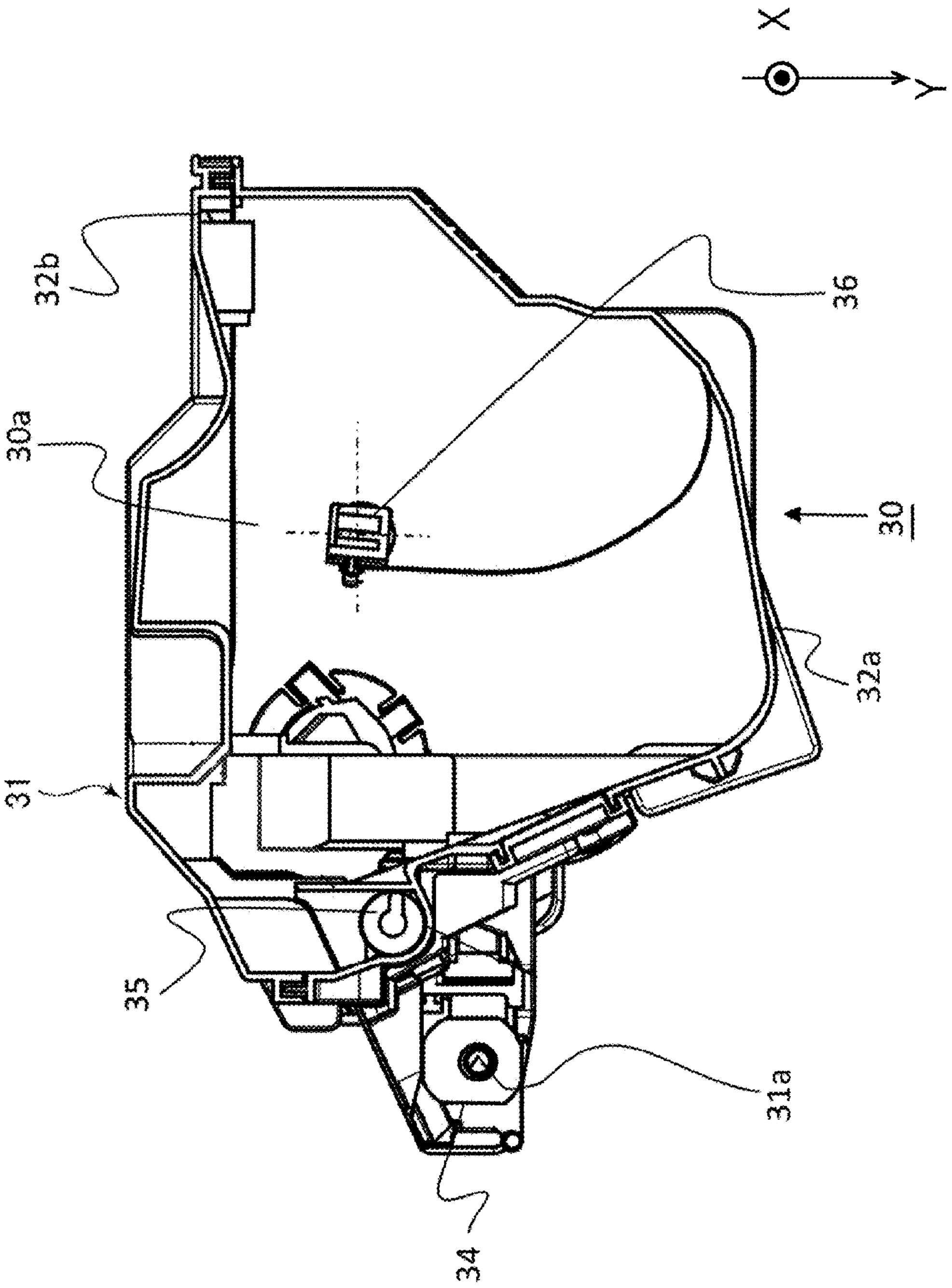
FIG. 10 is a cross-sectional view along d-d in FIG. 9.

As illustrated in FIG. 10, the toner supplying unit 30 includes a toner supply container 31 that is a first storage container where the toner is stored, and a toner discharging port 31*a* through which the toner in the toner supply container 31 is discharged to outside. The toner supply container 31 includes a supplying unit frame body 32*a* that forms a toner storage 30*a*, and a supplying unit lid 32*b*. The toner discharging port 31*a*, through which the toner in the toner storage 30*a* is discharged, is provided to the supplying unit frame body 32*a*. The supplying unit frame body 32*a* is also provided with a shutter member 34 enabled to open and to close the toner discharging port 31*a*. The shutter member 34 opens and closes the toner discharging port 31*a* by rotating in the directions of the arrow R1, in a manner interlocked with an operation of attaching or detaching the toner cartridge C to or from the process cartridge B. The shutter member 34 is disposed outside of the supplying unit frame body 32*a*.

The toner storage 30*a* has a toner storage screw member 35 for conveying the toner toward the toner discharging port 31*a*, as a toner conveyance member for conveying the toner to the toner discharging port 31*a*. The toner storage 30*a* also has a toner storage stirring conveying unit 36 for conveying the toner toward the toner storage screw member 35.

Figure 12A:
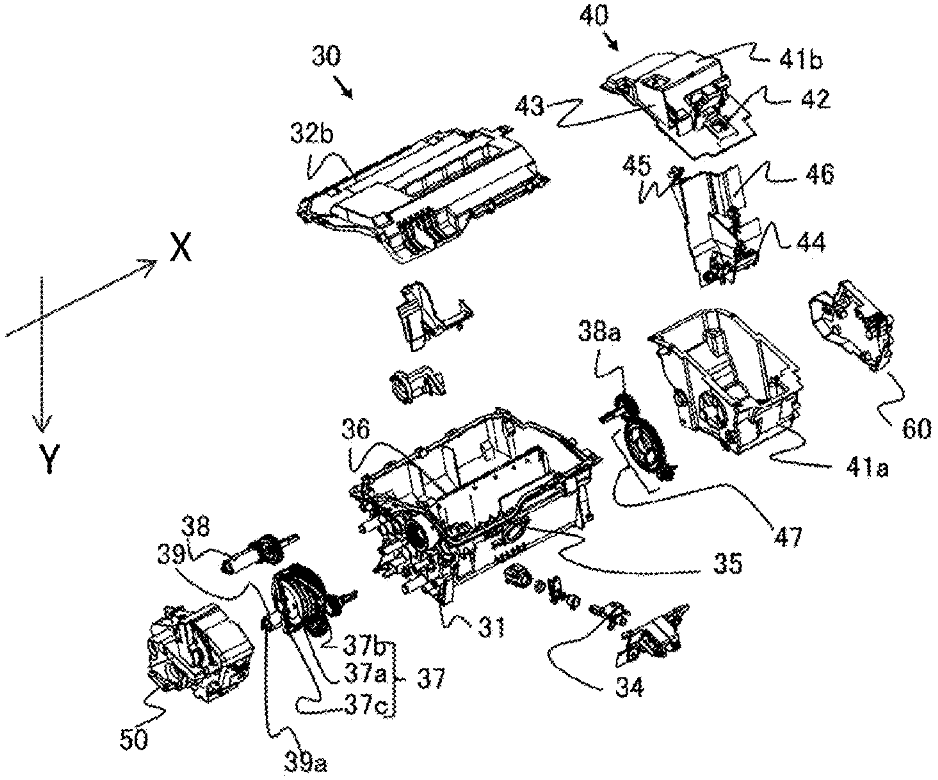
FIG. 12A is an exploded perspective view of the toner cartridge according to the first embodiment.
Figure 12B:
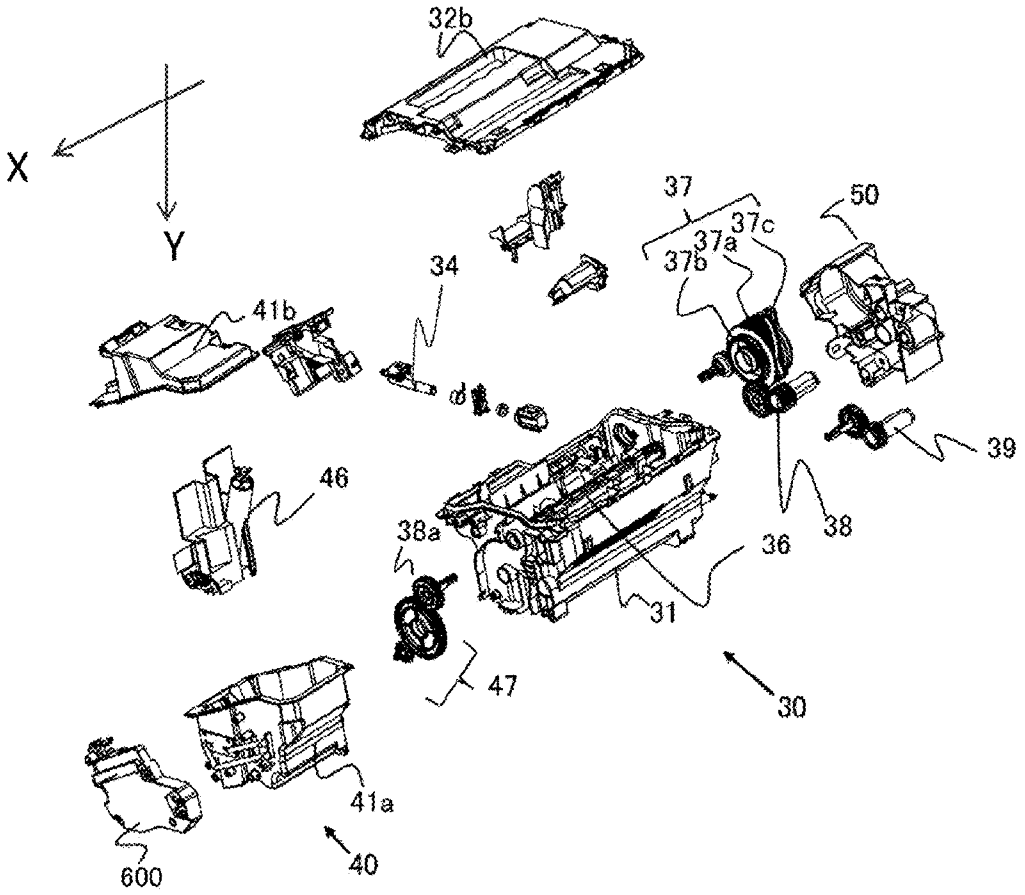
FIG. 12B is an exploded perspective view of the toner cartridge according to the first embodiment.

As illustrated in FIGS. 12A and 12B, the toner conveyed to the toner discharging port 31*a* is discharged to the outside of the toner discharging port 31*a*, by changing the volume of a pump 37*a* provided to a pump unit 37. The pump unit 37 includes the pump 37*a* the volume of which is changed by being extended and contracted, a cam 37*b* that is rotated to cause the pump 37*a* to extend and contract, and a link arm 37*c*. The toner supplying unit 30 also includes, as illustrated in FIGS. 8A, 8B, 12A, and 12B, a stirring driving force input unit 38 and a pump/screw driving force input unit 39, as toner conveyance driving units for driving a toner conveying unit. The stirring driving force input unit 38 drives the toner storage stirring conveying unit 36, and the pump/screw driving force input unit 39 drives the pump unit 37 and the toner storage screw member 35. A rotating driving force from the apparatus main body A is input to the pump/screw driving force input unit 39, via a pump/screw coupling portion 39*a* having a shape of a projection. The cam 37*b* and the link arm 37*c* convert this rotating driving force to a reciprocating motion. Using this reciprocating motion, the pump 37*a* having a bellows-like shape are caused to extend and to contract.

Waste Toner Storage Unit

Figure 11:
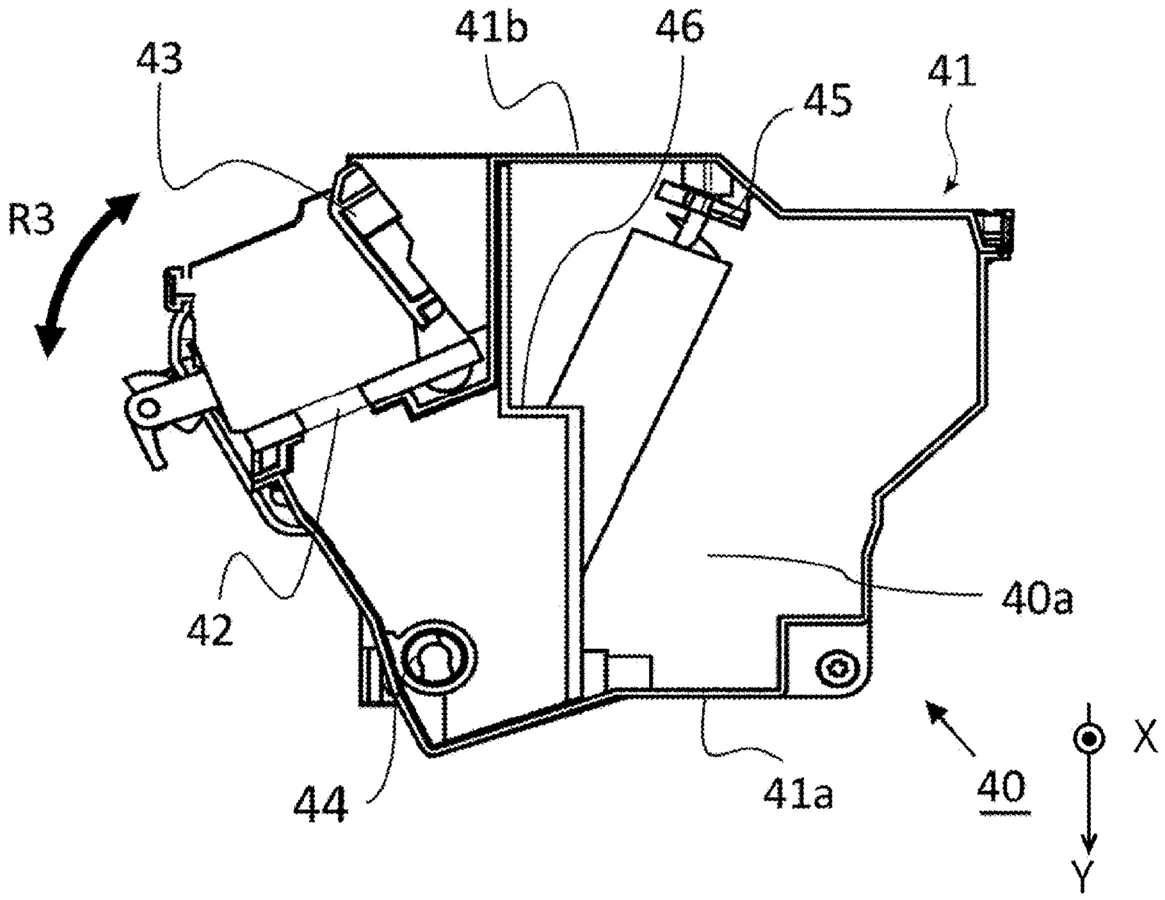
FIG. 11 is a cross-sectional view along e-e in FIG. 9.

As illustrated in FIG. 11, the waste toner storage unit 40 has a waste toner receiving port 42 for receiving waste toner from the process cartridge B, and a waste toner storage container 41 that is a second storage container for storing the waste toner received through the waste toner receiving port 42.

The waste toner storage container 41 includes a waste toner storage frame body 41*a* forming a waste toner storage 40*a*, and a waste toner storage lid 41*b*. The waste toner storage lid 41*b* has the waste toner receiving port 42 through which the collected waste toner is received from the process cartridge. The waste toner storage lid 41*b* has a waste toner shutter member 43 that opens and closes the waste toner receiving port 42. The waste toner shutter member 43 is opened or closed in the directions of the arrow R3 in FIG. 11, in a manner interlocked with the attaching and detaching operations of the toner cartridge C with respect to the apparatus main body A.

As illustrated in FIGS. 11 and 12A, a partition member 46, and a first waste toner storage screw 44 and a second waste toner storage screw 45, serving as waste toner conveyance members for conveying the waste toner inside the waste toner storage 40*a*, are provided inside the waste toner storage unit 40. The partition member 46 partitions the internal space of the waste toner storage unit 40 into a plurality of storages. The first waste toner storage screw 44 conveys, in the longitudinal direction of the toner cartridge C, the waste toner fallen through the waste toner receiving port 42. The second waste toner storage screw 45 receives a driving force from the first waste toner storage screw 44 and conveys the waste toner having been conveyed by the first waste toner storage screw 44 diagonally upwards.

As illustrated in FIGS. 12A and 12B, the toner storage stirring conveying unit 36 transmits the driving force received from the stirring driving force input unit 38 to a non-driving side of the toner supplying unit 30, and to a non-driving side toner storage stirring member gear 38*a*. The driving force of the non-driving side toner storage stirring member gear 38*a* is then transmitted, by a waste toner storage gear train 47, to the first waste toner storage screw 44. To the toner supplying unit 30 side, a driving-side toner cartridge side cover 50 is attached; and to the waste toner storage unit 40 side, a non-driving-side toner cartridge side cover 600 is attached.

With the configuration described above, it is possible to drive the stirring driving force input unit 38 even while the pump/screw driving force input unit 39 is not being driven. In other words, even while the toner supplying unit 30 is not supplying toner into the process cartridge B, by driving the first waste toner storage screw 44 and the second waste toner storage screw 45, it is possible to keep collecting the waste toner in the waste toner storage unit 40.

Furthermore, because the driving force of the apparatus main body A can be input to the one end of the toner cartridge C, the gear train in the apparatus main body A can be simplified. Furthermore, by transmitting the driving force from one end to the other end of the supplying unit frame body 32*a*, using the toner storage stirring conveying unit 36, it is possible to transmit the driving force to the waste toner storage unit 40 without increasing the number of components for transmitting the driving force. On the basis of the above, it is possible to suppress an increase in the size of the toner cartridge C and the apparatus main body A in the direction of the rotational axis of the photosensitive drum 11 due to the presence of means for driving the toner cartridge C, while allowing the waste toner to be stored in the toner cartridge C.

Description of Shutter Unit

Figure 1A:
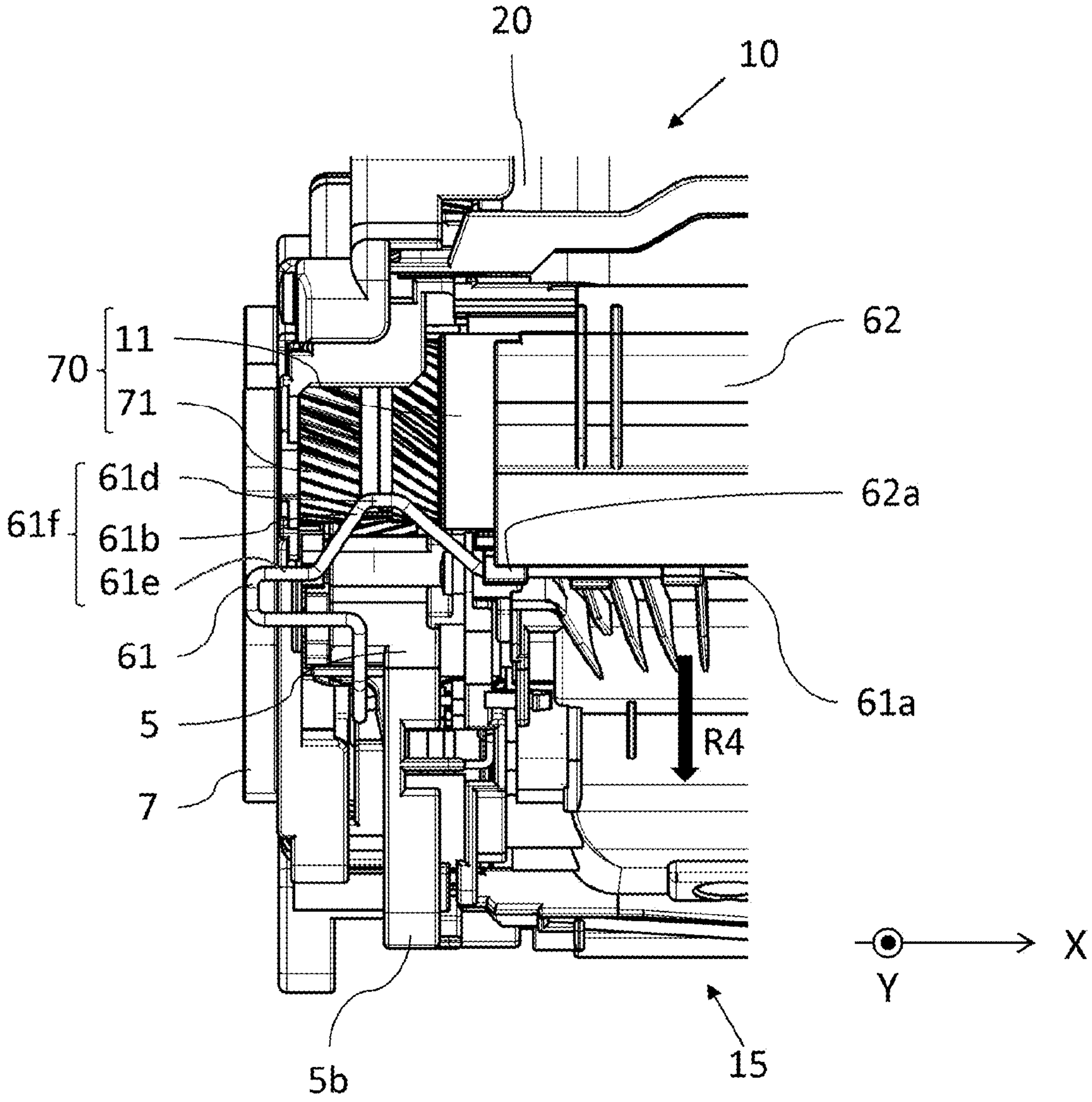
FIG. 1A is a bottom view of a process cartridge with a shutter unit positioned at a shielding position.
Figure 1B:
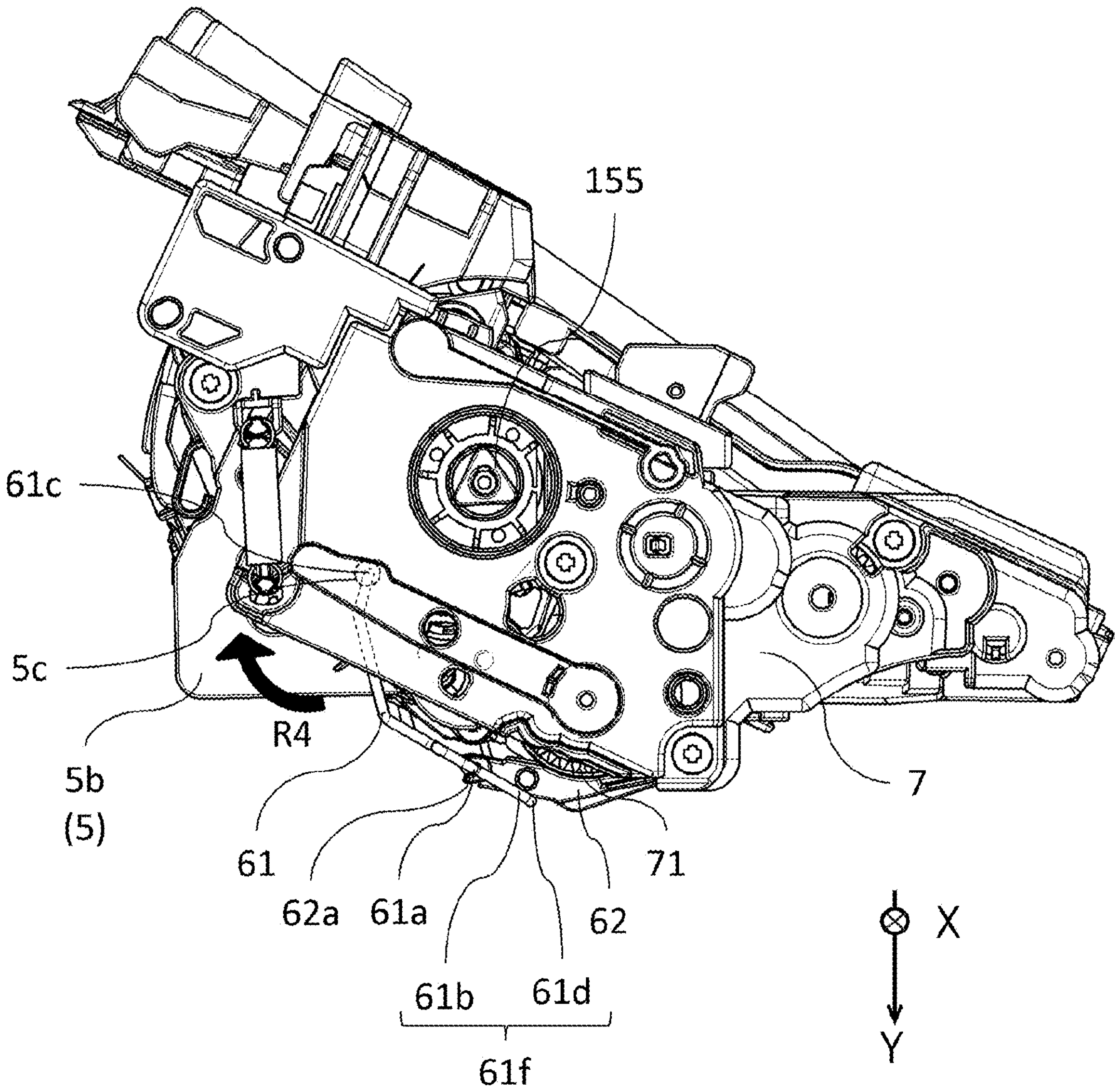
FIG. 1B is a side view of the process cartridge with the shutter unit positioned at the shielding position.
Figure 13A:
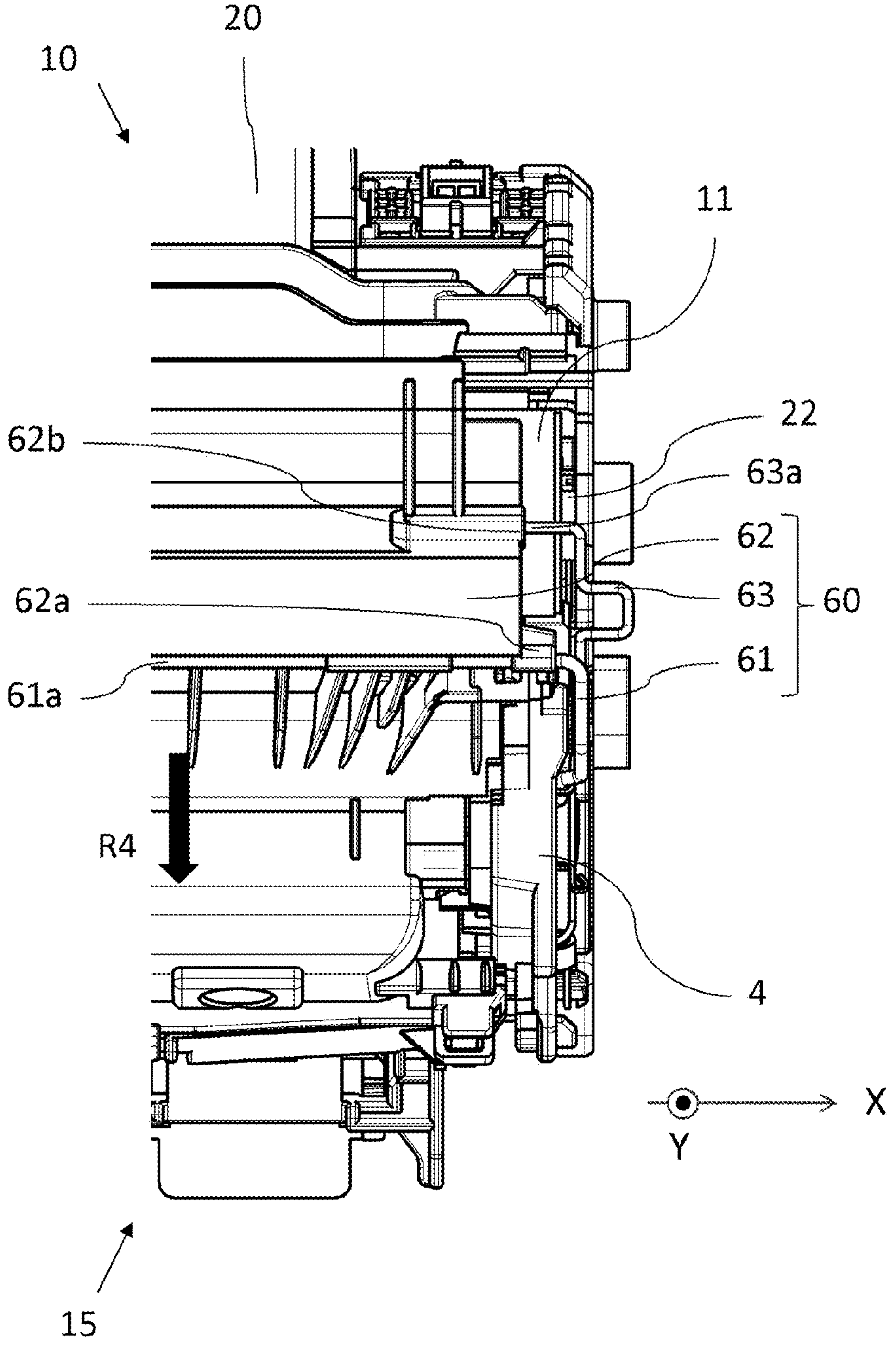
FIG. 13A is a bottom view of the process cartridge with the shutter unit positioned at the shielding position.
Figure 13B:
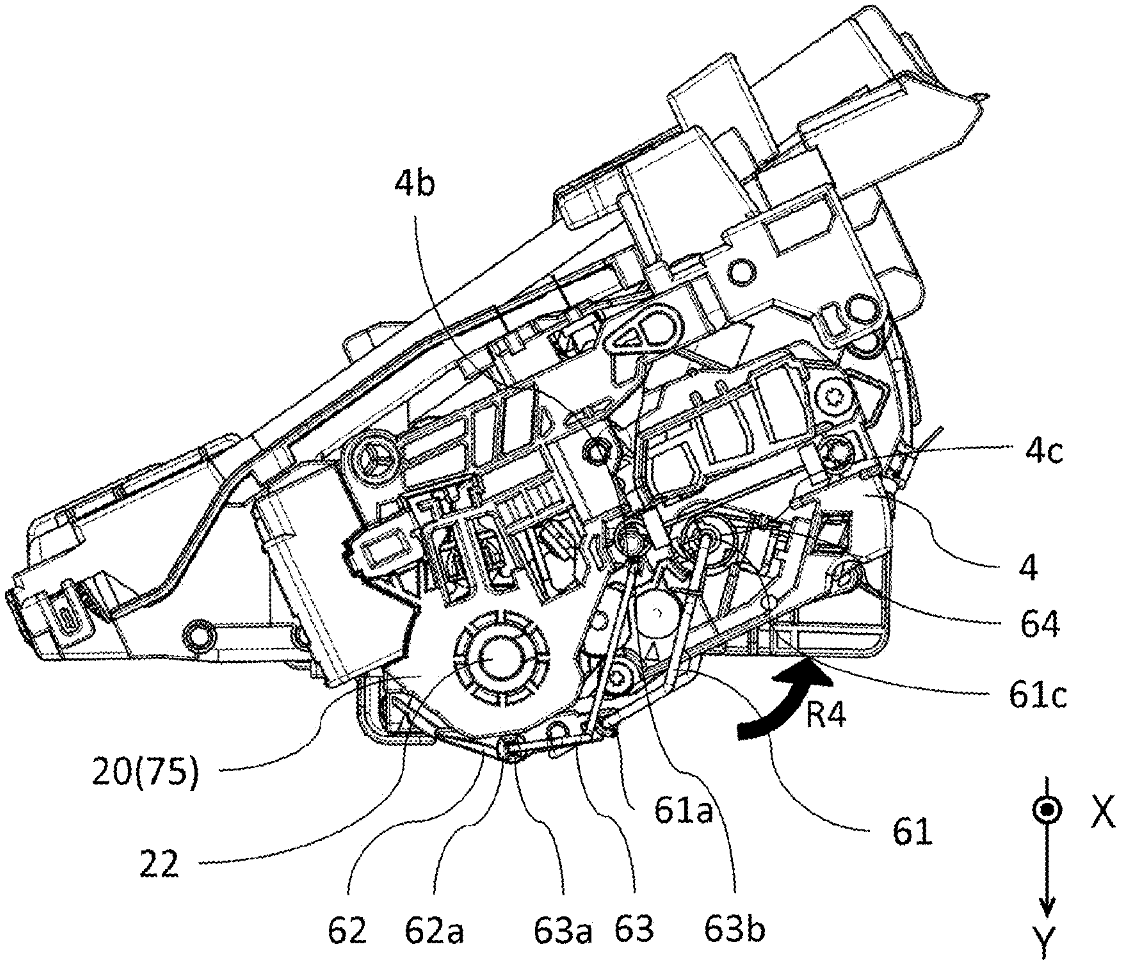
FIG. 13B is a side view of the process cartridge the shutter unit positioned at the shielding position.
Figure 14:
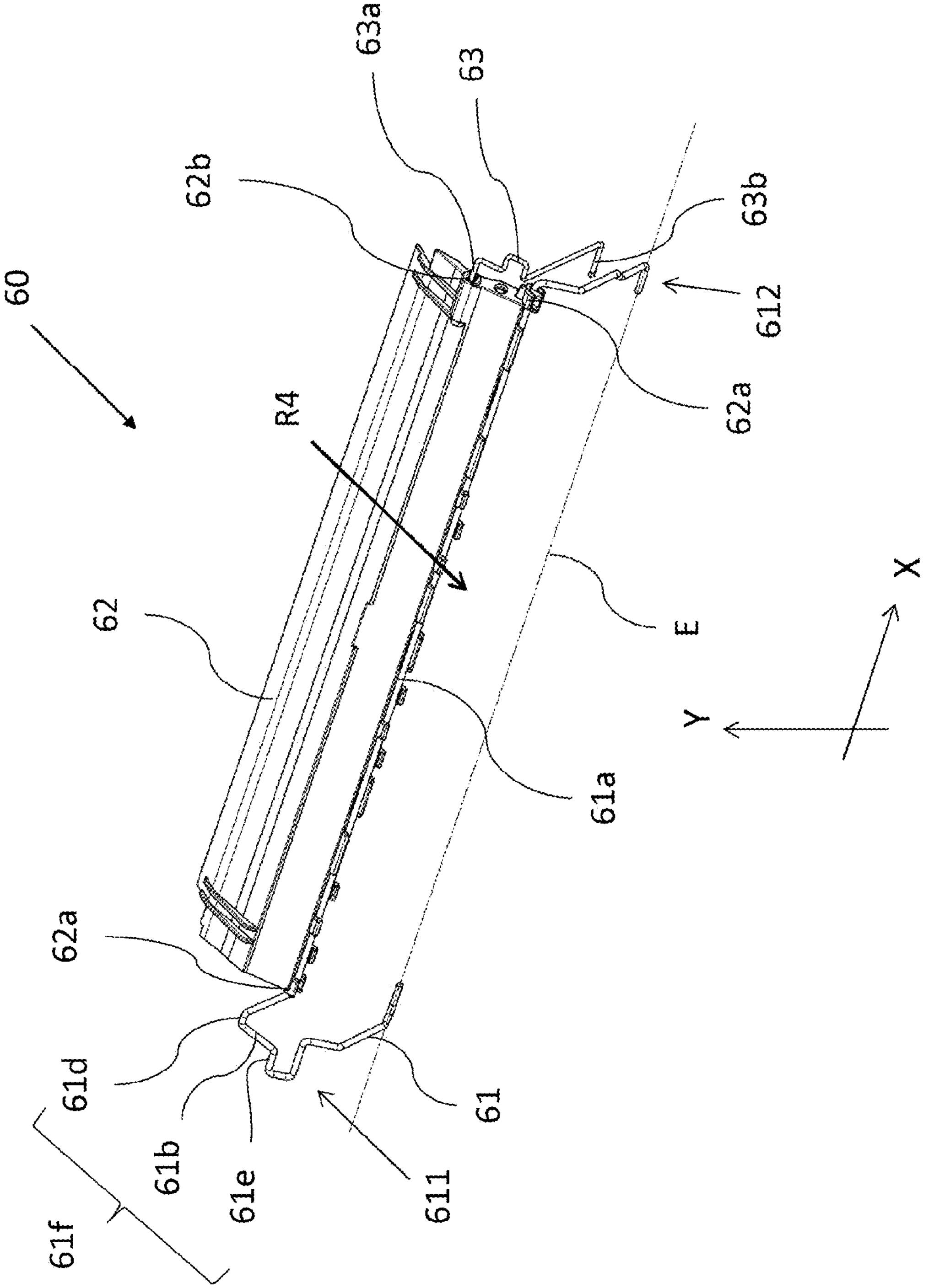
FIG. 14 is a perspective view of the shutter unit.

A structure of a shutter unit 60 will now be explained with reference to FIGS. 1A, 1B, 13A, 13B, and 14. In the description hereunder, the direction of the rotational axis of the photosensitive drum 11 will be referred to as a first direction X. The side provided with the developing coupling 155 will be referred to as a driving side, and the side opposite thereto will be referred to as a non-driving side. The driving side will be referred to as upstream in the first direction, and the non-driving side will be referred to as downstream in the first direction. FIG. 1A is a bottom view of the driving side of the process cartridge B with the shutter unit 60 at a shielding position, and FIG. 1B is a side view of the process cartridge B with the shutter unit 60 at the shielding position, viewed from the driving side. FIG. 13A is bottom view of the non-driving side of the process cartridge B with the shutter unit 60 at the shielding position, and FIG. 13B is a side view of the process cartridge B with the shutter unit 60 at the shielding position, viewed the non-driving side. FIG. 14 is a perspective view of the shutter unit 60.

As illustrated in FIGS. 1A, 1B, 13A, 13B, 14, and 16A, a drum unit 70 includes the photosensitive drum 11 and a drum gear 71. The photosensitive drum 11 is enabled to rotate about the first direction X as the rotational axis direction. The drum gear 71 is a drive member provided to the driving-side end of the photosensitive drum 11 (the upstream end in the first direction X). In the first direction X, the driving side is the side provided with the drum gear 71 that is a drive member of the photosensitive drum 11, and the non-driving side is the side not provided with the drum gear 71. The drum unit 70 has the non-driving side end supported rotatably by a drum pin 22 that is attached to the cleaning frame body 20 (see FIG. 7B) and has the driving side supported rotatably by a photosensitive drum support portion 7*b* (see FIG. 7B) provided to the side cover 7. The drum gear 71 receives a driving force from a drum drive gear (not illustrated) provided to the apparatus main body A, to cause the photosensitive drum 11 to rotate.

As illustrated in FIG. 4, the cartridge frame body 75 has an opening 23 that opens in a second direction Y intersecting with the first direction X. The cartridge frame body 75 is structured in such a manner that a circumferential part of the drum unit 70, which includes the photosensitive drum 11 and the drum gear 71, (a part in the rotating direction about the first direction X) is exposed through the opening 23. As a result, a part of the photosensitive drum 11 and the drum gear 71 in the circumferential direction is exposed through the opening 23. An outer side with respect to the inner side of the cartridge frame body 75, with the opening 23 therebetween, will be referred to as a downstream side in the Y direction.

The shutter unit 60 includes a link member 61, a shutter member 62, and an arm member 63.

Among the photosensitive drum 11 and the drum gear 71 exposed through the opening 23, the shutter member 62 is positioned downstream of the photosensitive drum 11 in the second direction Y and shields the surface of the exposed part of the photosensitive drum 11. Among the photosensitive drum 11 and the drum gear 71 exposed through the opening 23, the shutter member 62 does not shield the surface of the drum gear 71. The cartridge frame body 75 supports the link member 61 rotatably about a rotating axis E that is parallel with the first direction. To the link member 61, the shutter member 62 is attached, so that the cartridge frame body 75 and the shutter member 62 are joined with the link member 61. The shutter member 62 is rotated, by the rotation of the link member 61, about an axis that is in parallel with the first direction X. With this, the shutter member 62 is configured movable between the shielding position (FIGS. 1A, 1B, 13A, 13B, and 15) for shielding the exposed part of the photosensitive drum 11, the exposed part being exposed through the opening 23, and the open position (FIGS. 16A, 16B, 17A, and 17B) not shielding the exposed part. Within the range where the shutter member 62 is movable between the shielding position and the open position, the direction moving from the shielding position to the open position will be referred to as a positive direction along a third direction R4. Within the movable range of the shutter member 62, a side having the shielding position will be referred to as an upstream side in the third direction R4, and a side having the open position will be referred to as a downstream side in the third direction R4. The third direction R4 is a direction rotating about the first direction X, and intersecting with (in the first embodiment, perpendicular to) the second direction Y.

The link member 61 includes a first link portion 611, a second link portion 612, and a joined portion 61*a* that is a connecting portion connecting the first link portion 611 and the second link portion 612. The first link portion 611 rotates in conjunction with the second link portion 612. The first link portion 611 is supported rotatably by a link member support portion 5*c* (see FIG. 1B) provided to the bearing member 5, which is a part of the cartridge frame body 75 on the driving side (upstream side) in the first direction X. The second link portion 612 is a second link member that is supported rotatably by a link member support portion 4*c* provided to the bearing member 4, which is a part of the cartridge frame body 75 on the non-driving side (downstream side) of the developing unit 15 in the first direction X. The joined portion 61*a* extends in a direction in parallel with the first direction X. The link member support portion 4*c* of the bearing member 4 and the link member support portion (not illustrated) of the bearing member 5 are at the same position in a view in the first direction X. Therefore, the link member 61 is enabled to rotate about the rotating axis E.

The shutter member 62 extends in the first direction X. The first link portion 611 is attached to a part of the shutter member 62 on the driving side (upstream side) in the first direction X. The second link portion 612 is attached to a part of the shutter member 62 on the non-driving side (downstream side) in the first direction X. Joints 62*a* between the link member 61 and the shutter member 62 are positioned on a part of the shutter member 62 on a side nearer to the open position (on the downstream side) in the positive direction along the third direction R4, with the shutter member 62 positioned at the shielding position. The joined portion 61*a* of the link member 61 is rotatably joined to the joints 62*a* of the shutter member 62. In other words, the shutter member 62 is rotatably joined to the link member 61.

The arm member 63 is a third link member that is supported rotatably by an arm member support portion 4*b* of the bearing member 4, the arm member support portion 4*b* being a part of the cartridge frame body 75 on the non-driving side (downstream side) in the first direction X. The arm member 63 is joined to an arm member joint 62*b* provided to a part of the shutter member 62 on the non-driving side (downstream side) in the first direction X (non-driving-side end). The arm member joint 62*b* forming a joint between the arm member 63 and the shutter member 62 is provided at a position offset from the joint 62*a* between the second link portion 612 of the link member 61 and the shutter member 62 in the negative direction along the third direction R4 (on the upstream side).

A shutter member joint 63*a* is provided to one end of the arm member 63, and a cartridge frame body joint 63*b* is provided to the other end. The cartridge frame body joint 63*b* is supported rotatably by the arm member support portion 4*b* of the bearing member 4, the arm member support portion 4*b* being provided to a part of the developing unit 15, on the non-driving side in the first direction X. The shutter member joint 63*a* is supported rotatably by the arm member joint 62*b* provided on the shutter member 62.

The arm member joint 62*b* is provided at a position offset from the joints 62*a* in the negative direction along the third direction R4 (on the upstream side), and the arm member support portion 4*b* is provided at a position offset from the link member support portion 4*c* in the negative direction along the third direction R4 (on the upstream side). Therefore, the arm member 63 is provided at a position offset from the link member 61 in the negative direction along the third direction R4 (on the upstream of). The arm member 63 has a function for establishing the orientation of the shutter member 62 that is rotatably joined to the link member 61.

Figure 15A:
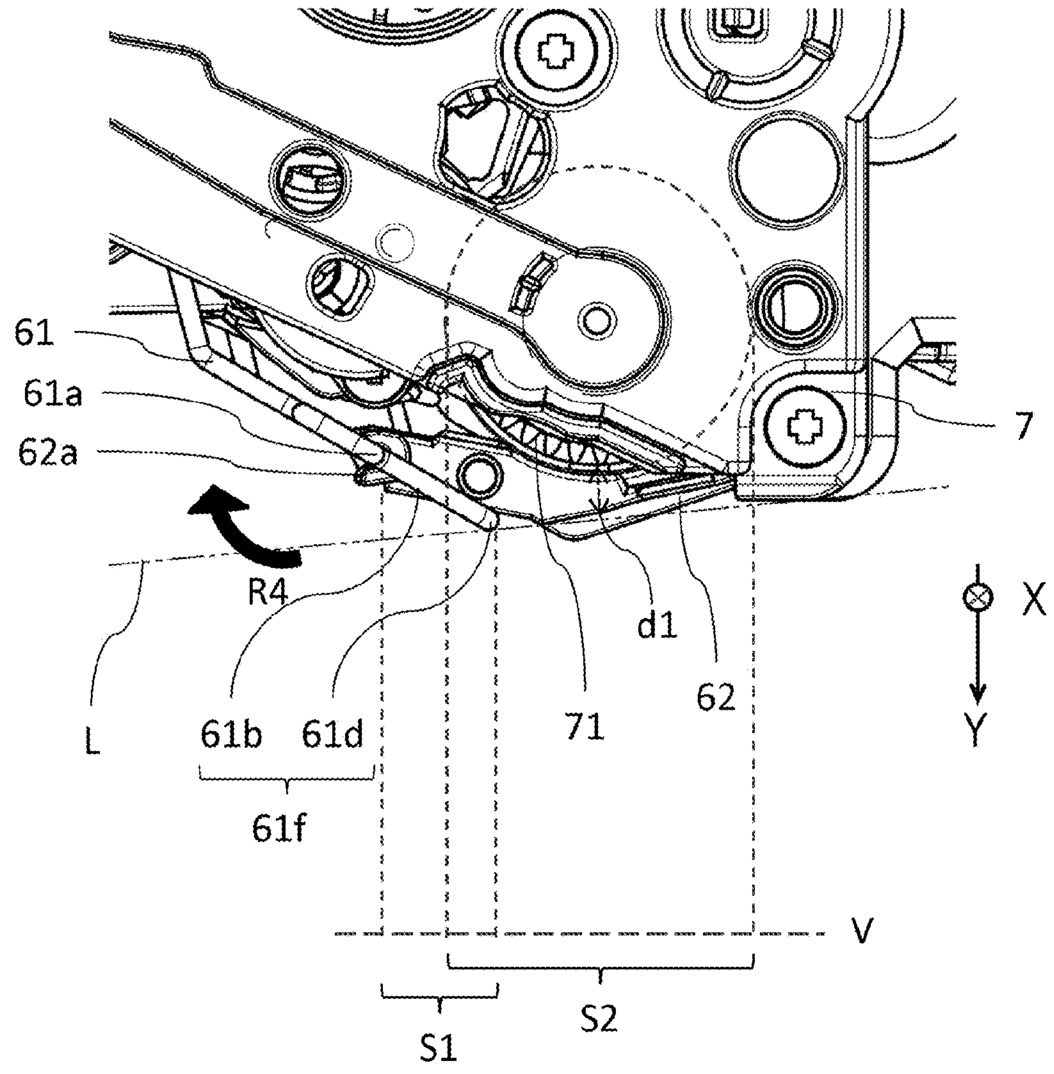
FIG. 15A is a side view of the process cartridge with the shutter unit positioned at the shielding position.
Figure 15B:
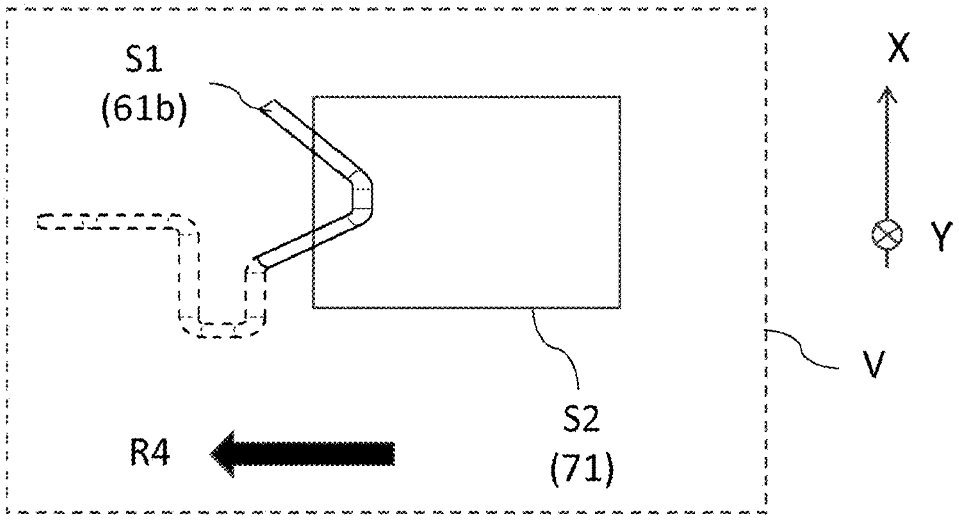
FIG. 15B is a schematic view illustrating a projection of a protruding portion and the drum gear projected onto an imaginary plane perpendicular to the second direction, with the shutter unit at the shielding position.
Figure 16A:
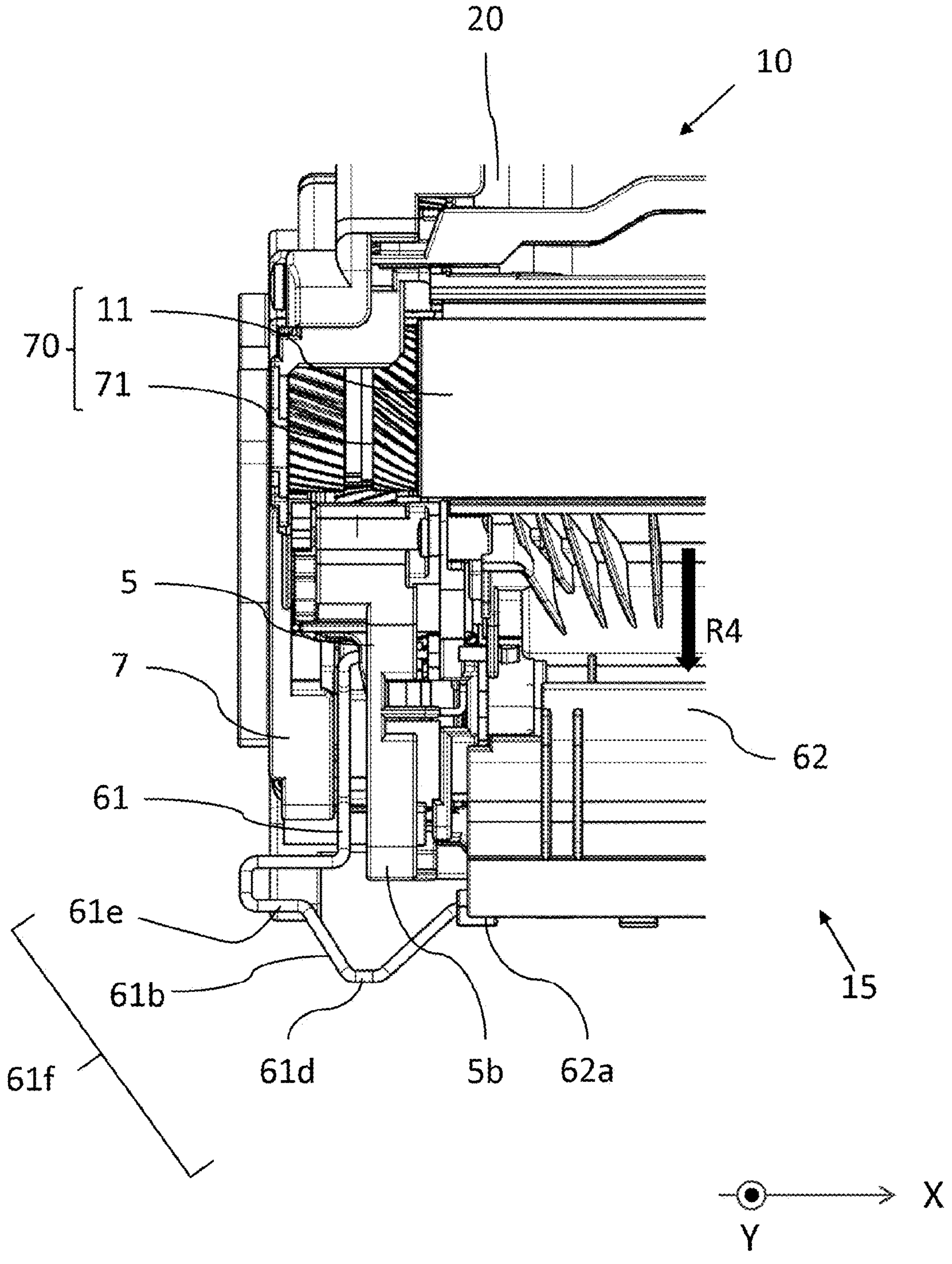
FIG. 16A is a bottom view of the process cartridge with the shutter unit positioned an open position.
Figure 16B:
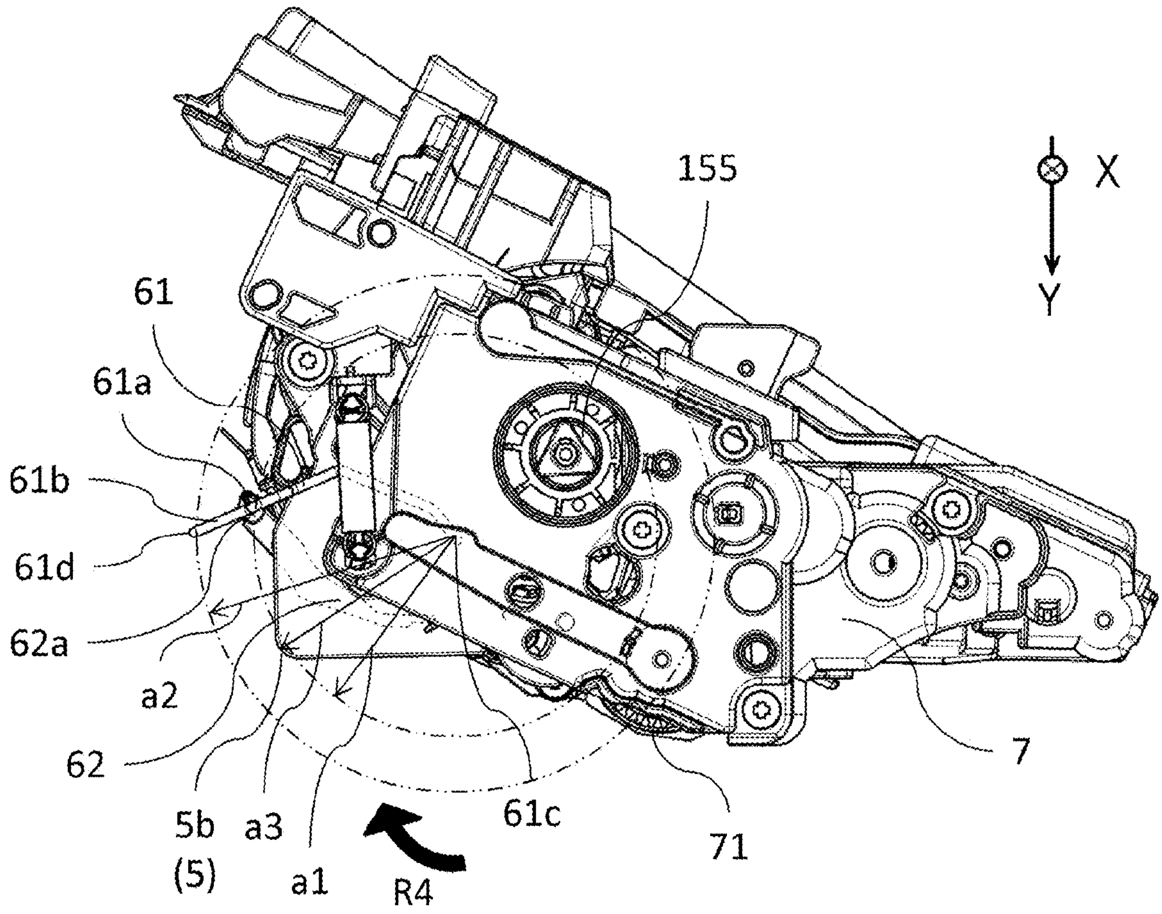
FIG. 16B is a side view of the process cartridge with the shutter unit positioned at the open position.
Figure 17A:
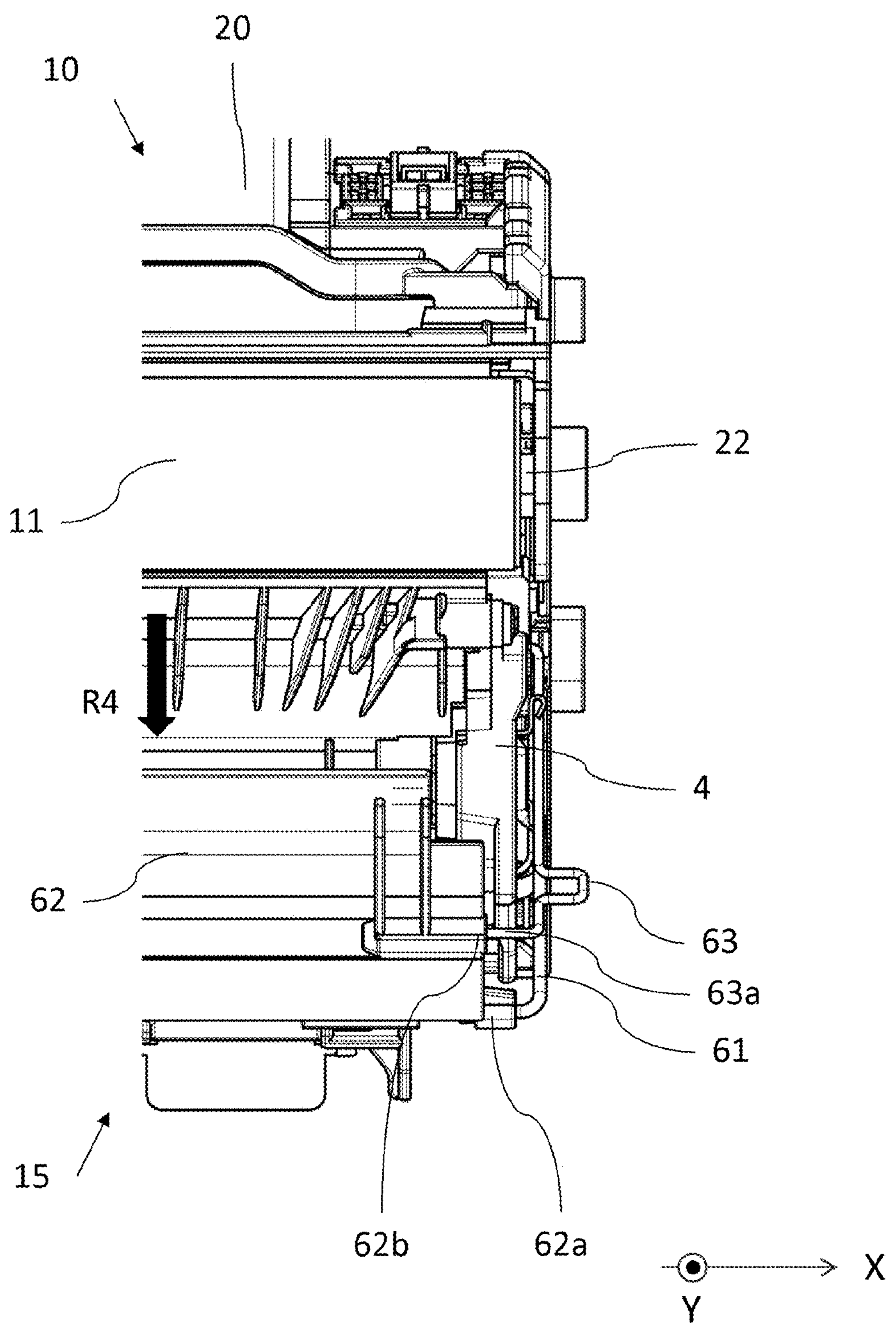
FIG. 17A is a bottom view of the process cartridge with the shutter unit positioned at the open position.
Figure 17B:
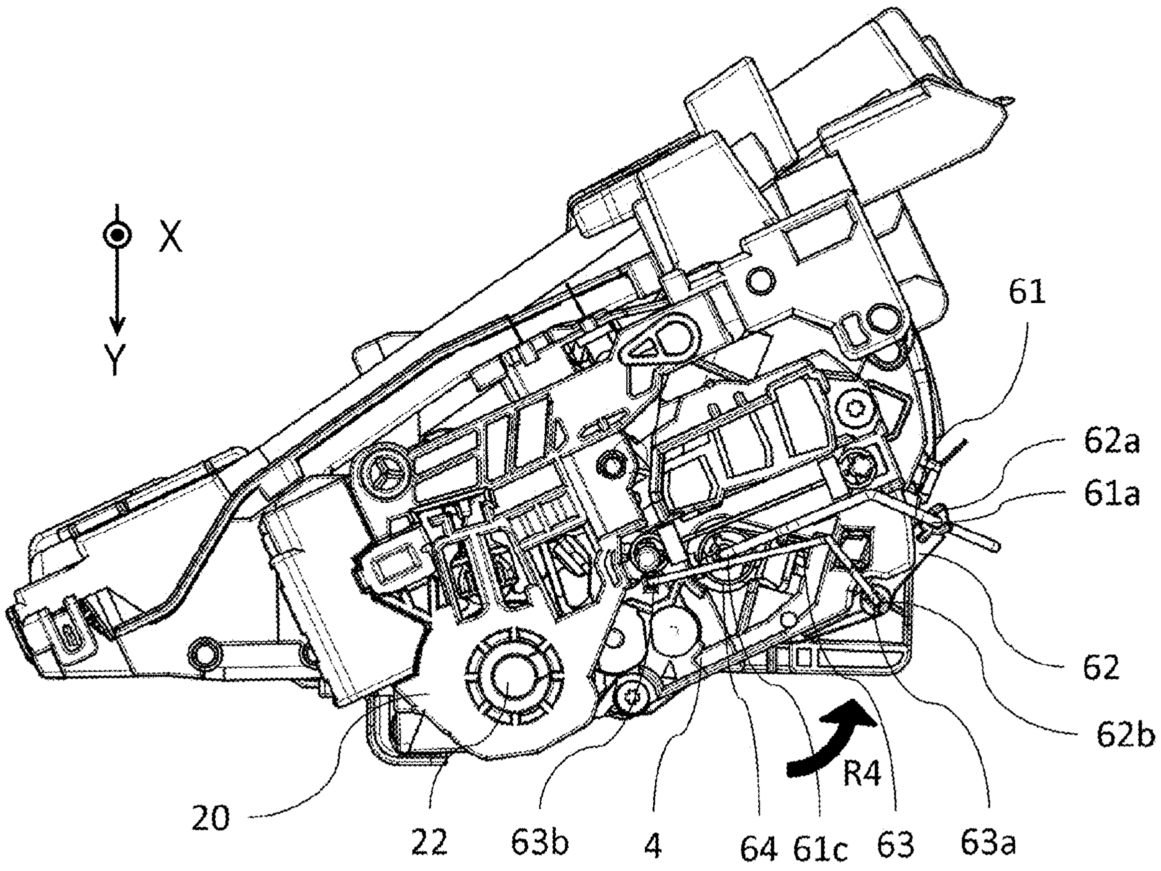
FIG. 17B is a side view of the process cartridge with the shutter unit positioned at the open position.
Figure 18:
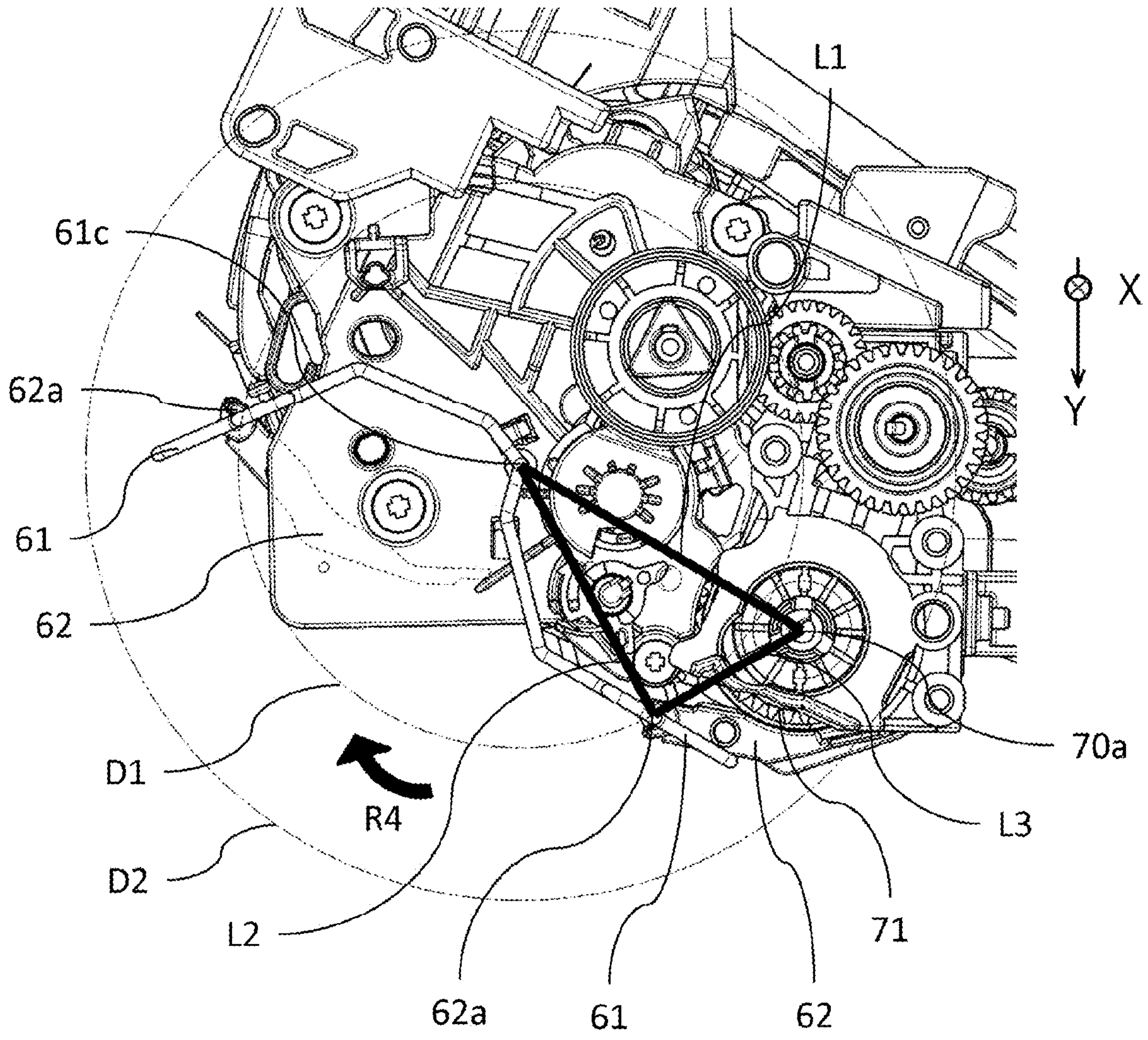
FIG. 18 is a side view of the process cartridge.

Configurations with the shutter unit 60 at the shielding position and at the open position will now be explained with reference to FIGS. 1A, 1B, and FIGS. 13A and 13B to 18. FIG. 15A is a side view of the process cartridge B with the shutter unit 60 at the shielding position, in a view from the driving side in the first direction X. FIG. 15B is a schematic view illustrating a projection of a protruding portion 61*b* and the drum gear 71, projected onto an imaginary plane perpendicular to the second direction Y, with the shutter unit 60 at the shielding position. FIG. 16A is a bottom view of a part of the process cartridge B with the shutter unit 60 at the open position, viewed from the driving side in the first direction X. FIG. 16B is a side view of the process cartridge B with the shutter unit 60 at the open position, viewed from the driving side in the first direction X. FIG. 17A is a bottom view of a part the process cartridge B with the shutter unit 60 at the open position, viewed from the non-driving side in the first direction X. FIG. 17B is a side view of the process cartridge B with the shutter unit 60 at the open position, viewed from the non-driving side in the first direction X. FIG. 18 is a schematic illustrating the shutter unit 60 at the shielding position and the shutter unit 60 at the open position in an overlapping manner, and is a side view of the process cartridge B, with the side cover 7 omitted, viewed from the driving side in the first direction X.

The shutter member 62 is enabled to move, in the third direction R4, between the shielding position for covering the photosensitive drum 11, and the open position where the photosensitive drum 11 is exposed, as the link member 61 and the arm member 63 are rotated. Within the movable range of the shutter member 62, the direction from the shielding position toward the open position will be referred to as a positive direction along the third direction R4. Also in this embodiment, as illustrated in FIG. 16B, the movable range of the shutter member 62 is a range across which the shutter member 62 is rotated from the shielding position to reach the open position, in the clockwise direction. The clockwise direction in a view in the first direction X corresponds to the positive direction along the third direction R4 and the counterclockwise direction corresponds to the negative direction along the third direction R4.

A configuration with the shutter member 62 at the shielding position will now be explained with reference to FIGS. 1A, 1B, 13A, and 13B. As illustrated in FIGS. 1A and 1B, when the shutter member 62 is at the shielding position, the shutter member 62 is at a position covering the photosensitive drum 11. At this time, the drum gear 71 provided to the driving-side end of the photosensitive drum 11 in the first direction X is not covered by the shutter member 62. Furthermore, at least a part of the drum gear 71 overlaps with at least a part of the protruded portion 5*b* of the bearing member 5 in the first direction X, and the driving-side end of the shutter member 62 is provided on the inner side of the protruded portion 5*b* of the bearing member 5 in the first direction X.

The link member 61 has a first portion 61*f* extending from the joint 62*a* toward the outside of the shutter member 62, in the direction from the non-driving side toward the driving side (toward the upstream side) in the first direction X. The first portion 61*f* has a portion 61*e* extending in the first direction X, and a protruding portion 61*b* protruding from the portion 61*e*, which extends in the first direction X, in the negative direction along the third direction R4 (toward the upstream side). As illustrated in FIGS. 15A and 15B, with the shutter member 62 at the shielding position, a projection S1 of the protruding portion 61*b* on an imaginary plane V that is perpendicular to the second direction Y overlaps with at least a part of a projection S2 of the drum gear 71 on the imaginary plane V. In other words, as illustrated in FIG. 15B, the protruding portion 61*b* is provided at a position at least partially overlapping with the drum gear 71 in the first direction X, and at least partially overlapping with the drum gear 71 in a view in the second direction Y. The protruding portion 61*b* protrudes from the joint 62*a* in the negative direction along the third direction R4 (toward the upstream side). With this, the protruding portion 61*b* protrudes in such a direction that the photosensitive drum 11 is covered by the protruding portion 61*b* when the shutter member 62 at the shielding position. Therefore, with the shutter member 62 at the shielding position, the protruding portion 61*b* is configured to cover a part of the drum gear 71.

Furthermore, as illustrated in FIGS. 13A and 13B, the bearing member 4 that is on the non-driving side in the first direction X is provided with a biasing member 64 biasing the shutter unit 60 toward the negative direction side along the third direction R4 (toward the shielding position). The biasing member 64 exerts a force for causing the link member 61 to move the shutter member 62 in the negative direction along the third direction R4 (toward the shielding position). In the first embodiment, the biasing member 64 is a twisted coil spring, and exerts a biasing force to the shutter member 62 in the negative direction along the third direction R4 (toward the shielding position) by exerting a biasing force to the link member 61 in the negative direction along the third direction R4 (toward the shielding position). With this, the shutter member 62 is kept at the shielding position while the process cartridge B is not attached to the apparatus main body A. Note that, by providing the biasing member 64 on the same side as the side with the arm member 63, stable operation of the shutter member 62 can be ensured.

A configuration of the process cartridge B removed from the apparatus main body A will now be explained with reference to FIGS. 15A and 15B. In a view in the first direction X, with the shutter member 62 at the shielding position, a part of the protruding portion 61*b* protruding the farthest to the negative direction side along the third direction R4 (toward the upstream side) will be referred to as a farthest protruding portion 61*d*. A line L connecting the farthest protruding portion 61*d* and the side cover 7 is at a distance d1 from the drum gear 71. If the process cartridge B having such a structure is placed on a surface such as a desktop, in an orientation with the shutter member 62 facing down, the protruding portion 61*b* (the farthest protruding portion 61*d*) and the side cover 7 will come into contact with the surface such as a desktop. That is to say, the drum gear 71 will remain separated from the surface such as a desktop by the distance d1 and does not come into contact with the surface such as a desktop. The line L may also be considered as an imaginary plane including the downstream end in the second direction Y of the protruding portion 61*b* and the downstream end in the second direction Y of the part of the cartridge frame body 75 outside a passing area where the shutter member 62 passes in the first direction X. Because this imaginary plane is separated from the drum gear 71 in the second direction Y, it is possible to suppress the drum gear 71 not covered by the shutter member 62 coming into contact with the surface such as a desktop, even when the process cartridge B is placed on the surface such as a desktop. In an orientation with the shutter member 62 facing down, as illustrated in FIG. 15A, the second direction Y will be a vertically downward direction, or a direction including a vertically downward component.

The shutter member 62 at the open position will now be explained with reference to FIGS. 16A, 16B, 17A, and 17B. In the process of attaching the process cartridge B to the apparatus main body A, the link member 61 becomes engaged with an engagement portion 300 (see FIG. 2) provided to the apparatus main body A. With this, a force is exerted to cause the link member 61 and the arm member 63 to rotate and to move the shutter member 62 in the positive direction along the third direction R4. The shutter member 62 is thus moved to the open position. The trajectory of this movement takes a course from a position at which the shutter member 62 does not overlap with the bearing member 5 in a view in the first direction X (see FIG. 1B), to a position at which the shutter member 62 overlaps with the bearing member 5. In other words, the trajectory of the opening or closing movement of the shutter member 62 between the shielding position and the open position traverses across the bearing member 5, and the protruded portion 5*b* of the bearing member 5 remains protruding outside of the trajectory of the opening or closing the shutter member 62. In the manner described above, a part of the cartridge frame body 75 outside the passing area in the first direction X where the shutter member 62 passes includes a portion overlapping with the passing area in the view in the first direction X. However, the size of the shutter member 62 in the first direction X is equal to or smaller than the size of the photosensitive drum 11, among the elements of the drum unit 70, in the first direction X, and the driving-side end of the shutter member 62 is provided on the inner side of the protruded portion 5*b* of the bearing member 5 in the first direction X. Therefore, the shutter member 62 does not interfere with the bearing member 5.

At this time, the protruding portion 61*b* of the link member 61 overlaps with the protruded portion 5*b* of the bearing member 5 in the first direction X. A distance a3 between the rotational center 61*c* of the link member 61 and the protruded portion 5*b* is larger than a distance a1 between the rotational center 61*c*, and the joints 62*a* and the joined portion 61*a* of the link member 61. Because the rotational radius of the joints 62*a* and the joined portion 61*a* is smaller than the distance a3 between the rotational center 61*c* and the protruded portion 5*b*, the joints 62*a* and the joined portion 61*a* are in a positional relationship interfering with the protruded portion 5*b*. However, because the driving-side end of the shutter member 62 in the first direction X is provided on the inner side of the protruded portion 5*b* of the bearing member 5, as described above, neither the shutter member 62 interferes with the bearing member 5, nor the joints 62*a* and the joined portion 61*a* interfere with the protruded portion 5*b*. The protruding portion 61*b* of the link member 61 is provided at a position overlapping with the protruded portion 5*b* of the bearing member 5 in the first direction X, as illustrated in FIGS. 1A and 16A. However, because the protruding portion 61*b* protrudes toward the negative direction side along the third direction R4 (toward the upstream side), a distance a2 between the rotational center 61*c* and the protruding portion 61*b* is greater than the distance a1 between the rotational center 61*c* and the joints 62*a* and the joined portion 61*a*. With this, the rotational radius of the protruding portion 61*b* when the shutter member 62 moves from the shielding position to the open position (or from the open position to the shielding position) is greater than the rotational radius of the joints 62*a* or the joined portion 61*a*. Furthermore, the protruding portion 61*b* is provided in such a position that the distance a2 between the protruding portion 61*b* and the rotational center 61*c* is greater than the distance a3 between the rotational center 61*c* and the protruded portion 5*b*. In this manner, because the rotational radius of the protruding portion 61*b* is greater than the distance a3 between the rotational center 61*c* and the protruded portion 5*b*, it is possible to avoid interference between the protruding portion 61*b* and the protruded portion 5*b* of the bearing member 5, along the trajectory of the opening or closing shutter member 62.

Furthermore, as described earlier, the joints 62*a* are provided on a part of the shutter member 62 on the positive direction side (the downstream side) along the third direction R4, with the shutter member 62 at the shielding position. In this embodiment, the joints 62*a* are provided on the positive direction side (downstream side) end of the shutter member 62 along the third direction R4 in an area thereof on the positive direction side along the third direction R4. As illustrated in FIG. 18, when the shutter member 62 is at the shielding position, the joints 62*a* are on the side nearer to a line segment L1 connecting the rotational center 61*c* of the link member 61 and the rotational center 70*a* of the drum unit 70, in a view in the first direction X. In other words, when the shutter member 62 is at the shielding position, a point at the intersection of a line passing through the rotational center 61*c* of the link member 61 and the rotational center 70*a* of the drum unit 70 with a perpendicular line drawn from the joints 62*a* to the line is at a position between the rotational center 61*c* and rotational center 70*a*. The joints 62*a* are also positioned in such a manner that a line segment L2 is longer than a line segment L3. The line segment L2 herein is a line segment connecting the joints 62*a* and the rotational center 61*c* of the link member 61, with the shutter member 62 at the shielding position. The line segment L3 is a line segment connecting the joints 62*a* and the rotational center 70*a* of the drum unit 70, with the shutter member 62 at the shielding position. With this configuration, the trajectory D1 followed by the joints 62*a* in the opening or closing operation when the shutter member 62 moves between the shielding position and the open position can be kept short.

As a comparative example, a configuration in which the joints 62*a* are provided to a part of the shutter member 62 on the negative direction side along the third direction R4 (upstream side), with the shutter member 62 at the shielding position, will be explained. An example of such a configuration is a configuration in which the joints 62*a* are provided to the end of the shutter member 62 on the negative direction side along the third direction R4 (upstream side). In FIG. 18 illustrates a trajectory D2, followed by the opening or closing operation of the joints 62*a* having such a configuration as the shutter member 62 moves between the shielding position and the open position. The radius of the trajectory D2 is larger than the radius of the trajectory D1 during the opening or closing operation (D2>D1). In contrast to such a configuration, in this embodiment, the trajectory D1 of the opening or closing shutter member 62 can be kept short, so that the size of the product can be kept small. Furthermore, in a configuration in which the joints 62*a* are provided to the part of the shutter member 62 on the positive direction side along the third direction R4, the joints 62*a* move by a shorter distance, as the joints 62*a* move between the shielding position and the open position, than that in a configuration in which the joints 62*a* are provided on a part on the negative direction side along the third direction R4. With this, stable operation of the shutter member 62 can be achieved. Furthermore, by setting the line segment L2 longer than the line segment L3, the joints 62*a* are provided to a position closer to the photosensitive drum 11. Therefore, the photosensitive drum 11 can be covered by a smaller shutter member 62. Hence, the shutter member 62 and the product can be reduced in size, advantageously.

With the configuration described above, it is possible to protect the drum gear 71 that is a drive member for driving the photosensitive drum 11, using the protruding portion 61*b* of the link member 61. Specifically, because the protruding portion 61*b* covers a part of the drum gear 71 while the shutter member 62 is at the shielding position, it is possible to prevent users from touching the drum gear 71. As a result, it is possible to prevent formation of a scratch or a dent on the drum gear 71.

Furthermore, the line L (see FIGS. 15A and 15B) connecting the farthest protruding portion 61*d* and the cartridge frame body 75 (the side cover 7) is at a position separated from the drum gear 71 by the distance d1 in a view in the first direction X. With this, even when the process cartridge B is removed from the apparatus main body A and placed on a surface such as a desktop, the drum gear 71 does not come into contact with the surface such as a desktop. Therefore, it is possible to suppress formation of a scratch or a dent resultant of the drum gear 71 coming into contact with a surface such as a desktop.

The configuration described above is a configuration in which the protection for the drum gear 71 is provided using the protruding portion 61*b* of the link member 61, which is required in causing the shutter member 62, which also provides a protection for the photosensitive drum 11, to operate. Therefore, it is possible to provide a protection for the drum gear 71 without providing a separate member for protecting the drum gear 71, so that the cost reduction can be achieved.

Furthermore, in a view in the first direction X, the joints 62*a* are on the side nearer to the line segment L1 connecting the rotational center 61*c* of the link member 61 and the rotational center 70*a* of the drum unit 70. In other words, a point at the intersection of the line passing through the rotational center 61*c* of the link member 61 and the rotational center 70*a* of the drum unit 70 with a perpendicular line drawn from the joints 62*a* to such line is at a position between the rotational center 61*c* and the rotational center 70*a*, when the shutter member 62 is at the shielding position. Furthermore, the joints 62*a* are positioned in such a manner that the line segment L2 connecting the joints 62*a* and the rotational center 61*c* of the link member 61 is longer than the line segment L3 connecting the joints 62*a* and the rotational center 70*a* of the drum unit 70 (L2>L3). With this configuration, the trajectory followed by the opening or closing shutter member 62 can be kept short, so that the process cartridge B can be reduced in size. Furthermore, because the joints 62*a* are provided at a position near the photosensitive drum 11, it is possible to cover the photosensitive drum 11 with a small shutter member 62. Therefore, the shutter member 62 and the process cartridge B can be reduced in size.

Furthermore, the drum gear 71 is protected by the link member 61, not by the shutter member 62 providing a protection for the photosensitive drum 11. With this, it is possible to prevent grease or the like used on the drum gear 71 from running along the shutter member 62 and becoming attached to the photosensitive drum 11.

Furthermore, the first embodiment is also applicable to any apparatus main body making the process cartridge removable, and the same kind of advantageous effects can be achieved. The functions, the materials, the shapes, and the relative positioning of the components described in the first embodiment are not intended to limit the scope of the present invention thereto, unless specified otherwise.

According to the present disclosure, it is possible to protect the cartridge while suppressing an increase in size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-197502, filed on Nov. 21, 2023, which is hereby incorporated by reference herein in its entirety.

What is claimed is:

1. A process cartridge attachable to and removable from an apparatus main body of an image forming apparatus, the process cartridge comprising:

a drum unit including a photosensitive drum rotatable about a rotational axis in parallel with a first direction and a drive member provided to an end of the photosensitive drum in the first direction;

a frame body rotatably supporting the drum unit and having an opening that opens in a second direction intersecting with the first direction, the opening exposing a part of the drum unit in a circumferential direction thereof;

a shutter member disposed downstream of a part of the photosensitive drum exposed through the opening in the second direction, and shielding a surface of the photosensitive drum, which is the part of the drum unit exposed through the opening, a link member supported on the frame body in a rotatable manner in a third direction that is a direction rotating about an axis parallel with the first direction and intersecting with the second direction and connecting the frame body and the shutter member attached to the link member, wherein the shutter member is caused to rotate by a rotation of the link member and is movable in the third direction between a shielding position shielding the exposed part of the photosensitive drum and an open position not shielding the exposed part of the photosensitive drum, a side of the photosensitive drum in the first direction in which the drive member is provided is a driving side, a side of the photosensitive drum in which the drive member is not provided is a non-driving side, and a direction in which the shutter member moves toward the open position from the shielding position within a movable range of the shutter member is a positive direction along the third direction, the link member is supported rotatably on a part of the frame body on the driving side in the first direction and attached to a part of the shutter member on the driving side in the first direction, in a state where the shutter member is at the shielding position, a joint between the link member and the shutter member is positioned on a part of the shutter member on the positive direction side along the third direction, the link member has a first portion extending from the joint toward the outside of the shutter member in the first direction from the non-driving side toward the driving side, and in a state where the shutter member is at the shielding position, at least a part of the first portion overlaps with the drive member in the first direction, and at least a part of the first portion overlaps with the drive member in a view in the second direction.

2. The process cartridge according to claim 1, wherein the first portion has a part extending in the first direction and a part protruding from the part extending in the first direction and protruding to a negative direction side along the third direction, in a state where the shutter member is positioned at the shielding position.

3. The process cartridge according to claim 1, further comprising a second link member supported rotatably on a part of the frame body on the non-driving side in the first direction and attached to a part of the shutter member on the non-driving side in the first direction.

4. The process cartridge according to claim 3, further comprising a connecting portion connecting the link member and the second link member, wherein the link member rotates in conjunction with the second link member.

5. The process cartridge according to claim 3, further comprising:

a third link member supported rotatably on a part of the frame body on the non-driving side in the first direction and attached to a part of the shutter member on the non-driving side in the first direction, wherein in a state where the shutter member is at the shielding position, a joint between the third link member and the shutter member is at a position offset from a joint between the second link member and the shutter member in the negative direction along the third direction.

6. The process cartridge according to claim 1, wherein a size of the shutter member in the first direction is equal to or smaller than a size of the photosensitive drum in the first direction, the photosensitive drum being included in the drum unit; and a part of the frame body outside a passing area in the first direction where the shutter member passes includes a portion overlapping with the passing area in a view in the first direction.

7. The process cartridge according to claim 1, wherein, in a state where the shutter member is at the shielding position, an imaginary plane including a downstream end in the second direction of the first portion and a downstream end in the second direction of the part of the frame body outside the passing area of the shutter member in the first direction is positioned offset from the drive member in the second direction.

8. The process cartridge according to claim 1, wherein, in a view in the first direction, a point at the intersection of a line passing through a rotational center of the link member and a rotational center of the drum unit with a perpendicular line drawn from the joint between the link member and the shutter member to the line in a state where the shutter member is at the shielding position is at a position between the rotational center of the link member and the rotational center of the drum unit.

9. The process cartridge according to claim 1, wherein a line segment connecting a rotational center of the link member and the joint between the link member and the shutter member in a state where the shutter member is at the shielding position is longer than a line segment connecting the rotational center of the drum unit and the joint in a state where the shutter member is at the shielding position.

10. The process cartridge according to claim 1, wherein the link member receives a force for causing the shutter member to move from the shielding position to the open position by engaging with an engagement portion provided in the apparatus main body during an attaching process of cartridge to the apparatus main body.

11. The process cartridge according to claim 1, further comprising a biasing member exerting a force to the link member causing the shutter member to move toward the negative direction along the third direction.

* * * * *